(12) United States Patent
Tan et al.

(10) Patent No.: US 10,852,735 B2
(45) Date of Patent: Dec. 1, 2020

(54) SELF-MOVING ROBOT SYSTEM

(71) Applicant: Positec Power Tools (Suzhou) Co., Ltd., Suzhou (CN)

(72) Inventors: Yiyun Tan, Suzhou (CN); Yong Shao, Suzhou (CN); Fangshi Liu, Suzhou (CN); Gen Sun, Suzhou (CN); Chang Zhou, Suzhou (CN); Guoliang Mou, Suzhou (CN); Sun Xifeng, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 376 days.

(21) Appl. No.: 15/789,397

(22) Filed: Oct. 20, 2017

(65) Prior Publication Data

US 2018/0081366 A1 Mar. 22, 2018

Related U.S. Application Data

(63) Continuation of application No. PCT/CN2016/110855, filed on Dec. 19, 2016.

(30) Foreign Application Priority Data

Dec. 17, 2015 (CN) .......................... 2015 1 0957392
Dec. 22, 2015 (CN) .......................... 2015 1 0974097
(Continued)

(51) Int. Cl.
*G01C 22/00* (2006.01)
*G05D 1/00* (2006.01)
(Continued)

(52) U.S. Cl.
CPC ........... *G05D 1/0214* (2013.01); *G01C 21/20* (2013.01); *G05D 1/0225* (2013.01);
(Continued)

(58) Field of Classification Search
CPC .. G05D 1/0214; G05D 1/0225; G05D 1/0261; G05D 1/0265; G01C 21/20; A01D 34/008
(Continued)

(56) References Cited

U.S. PATENT DOCUMENTS

2006/0195238 A1* 8/2006 Gibson ................ G05D 1/0061
701/23
2012/0290165 A1 11/2012 Ouyang
(Continued)

FOREIGN PATENT DOCUMENTS

CN 103576678 A 2/2014
CN 103809591 A 5/2014
(Continued)

OTHER PUBLICATIONS

English Translation for CN103809592A.*
(Continued)

*Primary Examiner* — Mahmoud S Ismail
(74) *Attorney, Agent, or Firm* — Marshall, Gerstein & Borun LLP

(57) ABSTRACT

A self-moving robot system may comprise a signal generating device configured to generate a preset signal; a signal detecting device, configured to detect the preset signal and generate a detection result; a signal line configured to radiate or/and receive the preset signal; and a control unit disposed on a self-moving robot, wherein the control unit receives the detection result and controls the self-moving robot to move according to the detection result; one end of the signal line is connected to the signal generating device or/and the signal detecting device; the signal line unidirectionally extends from the end, and the signal line does not constitute a circuitry loop. The system can realize judging a working area and/or guiding returning of the self-moving robot by a non-closed signal line, to thereby simplify arrangement of (Continued)

the border line or guide line, and improve the user experience.

28 Claims, 30 Drawing Sheets

(30) Foreign Application Priority Data

| Mar. 2, 2016 | (CN) | 2016 1 0118367 |
| Mar. 18, 2016 | (CN) | 2016 1 0156544 |
| Jul. 18, 2016 | (CN) | 2016 1 0562425 |
| Jul. 18, 2016 | (CN) | 2016 1 0564269 |
| Dec. 2, 2016 | (CN) | 2016 1 1096918 |
| Dec. 16, 2016 | (CN) | 2016 1 1167251 |

(51) Int. Cl.
*G05D 1/02* (2020.01)
*G01C 21/20* (2006.01)
*A01D 34/00* (2006.01)
*A01D 101/00* (2006.01)

(52) U.S. Cl.
CPC ......... *G05D 1/0261* (2013.01); *G05D 1/0265* (2013.01); *A01D 34/008* (2013.01); *A01D 2101/00* (2013.01); *G05D 1/0278* (2013.01); *G05D 2201/0208* (2013.01)

(58) Field of Classification Search
USPC ..................................................... 701/25, 23
See application file for complete search history.

(56) References Cited

U.S. PATENT DOCUMENTS

2014/0379196 A1 12/2014 Da Rocha et al.
2016/0113195 A1* 4/2016 Das ..................... A01D 34/008
                                                              701/25

FOREIGN PATENT DOCUMENTS

| CN | 103809592 A | * | 5/2014 |
| CN | 103869813 A | | 6/2014 |
| EP | 3073345 A1 | | 9/2016 |
| EP | 3073346 A1 | | 9/2016 |
| KR | 100575706 B1 | | 4/2006 |
| KR | 100629863 B1 | | 9/2006 |
| WO | WO-1999038056 A1 | | 7/1999 |
| WO | WO-2002075470 A1 | | 9/2002 |
| WO | WO-2011115563 A1 | | 9/2011 |
| WO | WO-2014058358 A1 | | 4/2014 |
| WO | WO-2014071860 A1 | | 5/2014 |
| WO | WO-2014129944 A1 | | 8/2014 |
| WO | WO-2016000734 A1 | | 1/2016 |

OTHER PUBLICATIONS

International Search Report for International application No. PCT/CN2016/110855, dated Mar. 16, 2017.

European Examination Report for Application No. 16874939.8, dated Mar. 31, 2020.

* cited by examiner

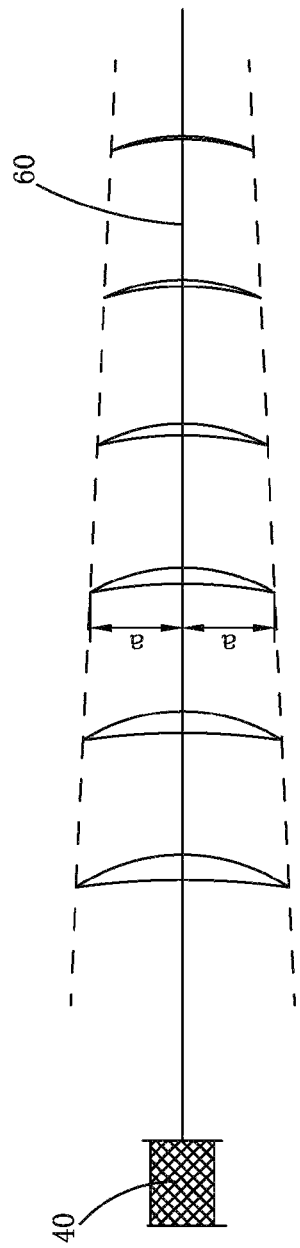
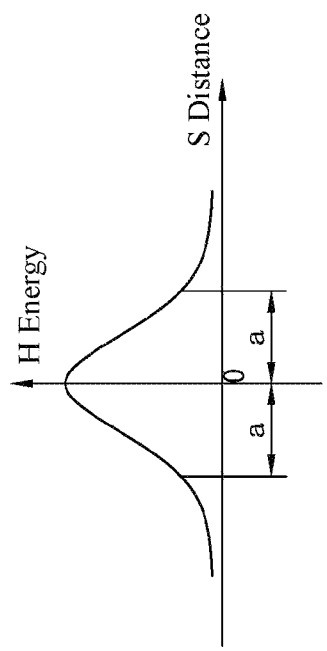
FIG. 9 (a)
FIG. 9 (b)

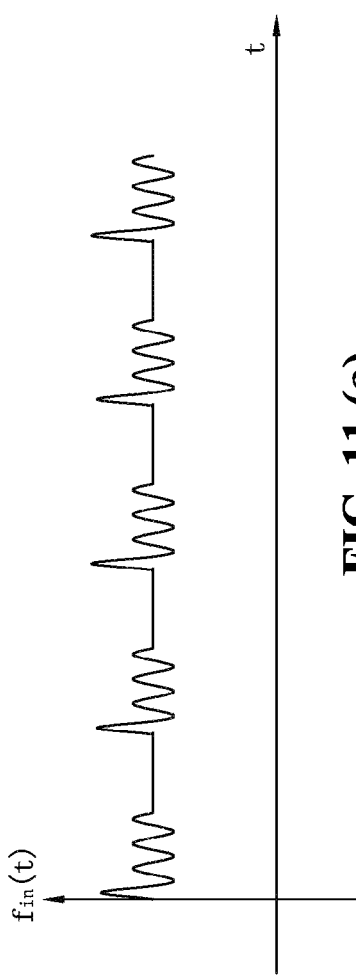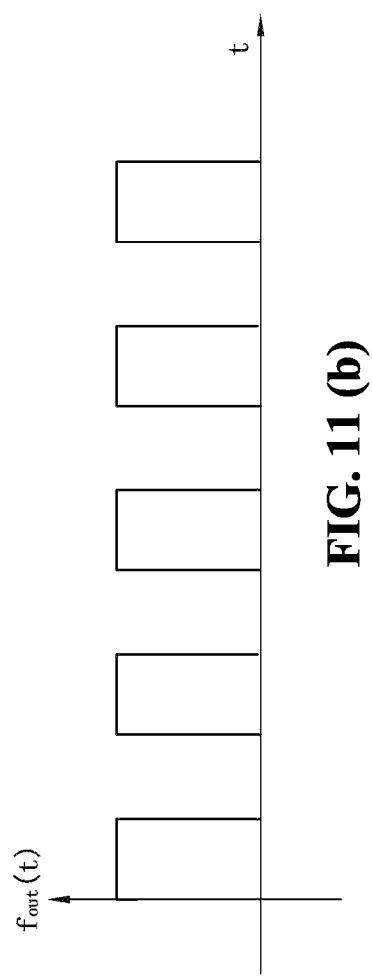
FIG. 11 (a)
FIG. 11 (b)

SELF-MOVING ROBOT SYSTEM

CROSS-REFERENCE TO RELATED APPLICATIONS

This is a continuation of International Patent Application No. PCT/CN2016/110855, filed Dec. 19, 2016, which claims priority to Chinese Application No. CN201510957392.5, filed Dec. 17, 2015, Chinese Application No. CN201510974097.0, filed Dec. 22, 2015, Chinese Application No. CN201610118367.2, filed Mar. 2, 2016, Chinese Application No. CN201610156544.6, filed Mar. 18, 2016, Chinese Application No. CN201610562425.0, filed Jul. 18, 2016, Chinese Application No. CN201610564269.1, filed Jul. 18, 2016, Chinese Application No. CN201611096918.6, filed Dec. 2, 2016, and Chinese Application No. CN201611167251.4, filed Dec. 16, 2016. Each of the foregoing is incorporated by reference herein in its entirety.

FIELD OF THE DISCLOSURE

Example embodiments generally relate to a self-moving robot system, in particular to a self-moving robot system capable of moving and working in a preset working area and a self-moving robot system capable of being returned to a certain preset position automatically.

BACKGROUND

Along with development of scientific technology, people are very familiar with an intelligent self-moving robot, since the self-moving robot can execute preset related tasks automatically according to a preset program without manual operation and intervention, and therefore is very widely applied to industrial applications and household products. Industrial applications comprise for example a robot executing various functions, the household product applications comprise for example an intelligent mower, an intelligent mower, etc., and these intelligent self-moving robots greatly save time for people and bring great convenience to industrial production and home life.

The self-moving robot such as the intelligent mower usually has a working mode and a returning mode. Under the working mode, the self-moving robot moves and executes preset related tasks in a preset working area. Under the returning mode, the self-moving robot automatically moves to a charging station according to a preset path for charging or parking.

Under the working mode, in order to limit the self-moving robot to only work in the preset working area, in the industry, a border system is generally adopted to control the working area of the self-moving robot. As shown in FIG. 1, the border system comprises a signal generating device 40', a self-moving robot 10' and a border line 50'. The self-moving robot 10' is controlled to only work and move at one side of the border line 50' by recognizing the border line 50'. In this embodiment, the border line 50' plans a working area 30' encircled by the border line 50' and a nonworking area 100' located outside the border line 50'. The signal generating device 40' and the border line 50' are electrically connected, the signal generating device 40' generates a preset border signal SC and transmits to the border line 50', and a changed magnetic field 90' is generated when the preset border signal SC flows by the border line 50'. The self-moving robot 10' further comprises a signal detecting device 20' and a control unit 80' (not shown). The signal detecting device 20' detects the changed magnetic field 90' and generates a detection signal SC'. The control unit 80' receives the detection signal SC' and controls the self-moving robot 10' to move in the working area 30' according to the detection signal SC'.

The preset border signal SC is an electric signal changed along with time. As shown in FIG. 2, in such embodiment, the preset border signal SC' is specifically a periodic pulse current signal, and the preset border signal SC' will generate a changed magnetic field 90' at the periphery of the border line 50' when flowing by the border line 50'. At any moment, the magnetic field 90' presents opposite polarities at both sides of the border line 50', that is, the polarity of the magnetic field in the working area 30' and the polarity of the magnetic field in the nonworking area 100' are opposite. As known by those skilled in the art, it can be ensured that the working area 30' is filled with the magnetic field by controlling an amplitude value of the preset border signal SC.

In a specific embodiment, the signal generating device 40' comprises a power source and a controllable switch, and the signal generating device 40' and the border line 50' are connected to constitute an electric loop. By controlling OFF and ON of the controllable switch, the preset border signal SC' as shown in FIG. 2 can be generated.

The signal detecting device 20' can have various manners as long as the magnetic field 90' can be converted to a corresponding electric signal, and preferably, the signal detecting device 20' comprises an inductor. The signal detecting device 20' senses the magnetic field 90' and generates a corresponding electric potential, such that the magnetic field 90' is converted to the detection signal SC' which is transmitted to the control unit 80'. The polarity of the magnetic field 90' in the working area 30' and the polarity of the magnetic field 90' in the nonworking area 100' are opposite, and correspondingly, the polarity of the detection signal SC' in the working area 30' and the polarity of the detection signal SC' in the nonworking area 100' are opposite.

The control unit 80' judges whether the self-moving robot 10' crosses over the border line 50' or not according to the polarity of the detection signal SC'. When the polarity of the detection signal SC' is detected to be changed, the control unit 80' determines that the self-moving robot 10' is crossing over the border line 50'. The control unit 80' controls the self-moving robot 10' to retreat or steer, such that the detection signal SC' is changed to the initial polarity, and therefore, it can be ensured that the self-moving robot 10' always works in the working area 30'.

Under the retuning mode, in order to ensure that the self-moving robot can be automatically returned to the charging station according to a preset path, in the industry, the border system above is often used as hardware, by changing a control algorithm of the self-moving robot, the self-moving robot 10' is guided to return to the charging station along the border line. Under the returning mode, the original border line 50' is a guide line of the self-moving robot 10'.

As shown in FIG. 3, the self-moving robot system also comprises a charging station 70', the signal generating device 40' is arranged on the charging station 100' or the signal generating device 40' and is connected to the charging station 100'. When the control unit 80' receives a returning command, the control unit 80' controls the self-moving robot 10' to move randomly or move along a predetermined direction to seek for the border line 50'. The control unit 80' judges whether the self-moving robot 10' crosses over the border line 50' according to the polarity of the detection signal SC'. When the polarity of the detection signal SC' is changed, the control unit 80' determines that the self-moving robot 10' is crossing over the border line 50'. A returning algorithm is set in the control unit 80', and the self-moving robot 10' is controlled to return to the charging station 70' in a zigzag virtual line as shown in FIG. 3 along the border line 50'.

In order to improve efficiency that the self-moving robot 10' is returned to the charging station 100', the self-moving robot 10' is provided with two signal detecting devices 20', respectively including a first signal detecting device 21' and a second signal detecting device 22'. As shown in FIG. 4, the first signal detecting device 21' and the second signal detecting device 22' are respectively located on symmetric left and right sides of a middle axis of the self-moving robot. When the self-moving robot 10' is returned to the charging station 100', the control unit 80' controls the self-moving robot 10' to move to a border direction, and when the detection signals SC' detected by the first signal detecting device 21' and the second signal detecting device 22' have opposite directions, the self-moving robot 1' judges that it is in a line-crossing state. The border line 50' leads to the charging station 70', and the self-moving robot 10' can return to the charging station 70' clockwise or counterclockwise along the border line 50'.

The self-moving robot judges the working area and the returning guide both based on the changed magnetic field signal, and for a technical means for generating a changed magnetic field signal, it is necessary for the changed current to flow by the border line or guide line. Therefore, in prior art, a closed circuit is necessarily arranged on the border line or guide line of the self-moving robot system to constitute a circuitry loop. When the area of the working area is larger, the signal generating device needs to generate a preset border signal with a very large amplitude value, only then it can be ensured that the working area can be filled with the magnetic field, and this manner will increase power consumption of a self-moving robot system; when the area of the working area is larger, a length of the border line or guide line that needs to be paved will be very long, and stamina and property will be wasted; and when an obstacle such as a wall surface or bush just exists on the border of the working area, it is very troublesome for the user to set the closed border line or guide line on the place where the obstacle exists, and an experience feel that the user uses the self-moving robot system is severely influenced.

SUMMARY

In one embodiment, a self-moving robot system automatically moves and automatically works in a working area and comprises a signal generating device, generating a preset signal suitable to be radiated to a free space in a radio wave manner, the preset signal comprising a modulated signal having a characteristic frequency and a carrier signal having a carrier frequency; a signal line, configured to radiate the preset signal to the free space in the radio wave manner or receive the preset signal existing in the free space in the radio wave manner; a signal detecting device, receiving a radio signal existing in the free space in the radio wave manner and recognizing the modulated signal by the characteristic frequency, thereby generating a detection result; and a control unit, disposed in the self-moving robot to receive the detection result and controlling the self-moving robot to move according to the detection result, wherein one end of the signal line is connected to the signal generating device or/and the signal detecting device and the signal line unidirectionally extends from the one end and does not constitute a circuitry loop.

In another embodiment, a self-moving robot system automatically moves and automatically works in a working area and comprises a signal generating device, generating a preset signal suitable to be radiated to a free space in a radio wave manner; a signal line, configured to radiate the preset signal to the free space in the radio wave manner or receive the preset signal existing in the free space in the radio wave manner; a signal detecting device, receiving a radio signal existing in the free space in the radio wave manner and recognizing the modulated signal, thereby generating a detection result; and a control unit, disposed in the self-moving robot to receive the detection result and controlling the self-moving robot to move according to the detection result, wherein the signal line comprises a start point And an endpoint, the start point is connected to the radio signal generating device or/and the radio signal detecting device and the endpoint is a free end of the signal line.

In another embodiment, a self-moving robot system automatically moves and automatically works in a working area and comprises a signal generating device, generating a preset signal having a characteristic frequency; a signal line, configured to radiate the preset signal to the free space in the radio wave manner or receive the preset signal existing in the free space in the radio wave manner; a signal detecting device, receiving a radio signal existing in the free space in the radio wave manner and detecting a signal intensity corresponding to the characteristic frequency after demodulation; and a control unit, disposed in the self-moving robot to receive the signal intensity and controlling the self-moving robot to move or work according to the signal intensity, wherein the signal line is connected to the signal generating device or/and the signal detecting device and no current flows by the signal line.

In another embodiment, a recognizing method for a walking direction comprises the steps: receiving a direction guide signal; analyzing a change trend of an intensity value of the direction guide signal in preset time; and recognizing whether the walking direction is correct according to an analyzing result.

In another embodiment, a path returning method for a self-moving robot, which comprises receiving a returning signal of a current location where the self-moving robot is; judging an intensity of the returning signal of the current location and that of a preset returning signal; guiding the self-moving robot to move toward a direction of the preset returning signal if the intensity of the returning signal of the current location is larger than or smaller than that of the preset returning signal; and guiding the self-moving robot to return and move along the returning signal of the current location if the intensity of the returning signal of the current location is equal to that of the preset returning signal.

In another embodiment, a signal device comprises a signal emitting unit, including a signal source and an emitting antenna, wherein one end of the emitting antenna is connected to the signal source, the other end unidirectionally extends, the emitting antenna does not constitute a circuitry loop, and the signal source emits a first radio signal through the emitting antenna; and a signal inhibiting unit, including a noise source, wherein the noise source is disposed nearby the signal source and is configured to emit a second radio signal, the second radio signal and the first radio signal have different frequencies or a phase difference exists between the second radio signal and the first radio signal, and the second radio signal is configured to inhibit the first radio signal.

In another embodiment, a robot system comprises a robot and a charging station; the robot is configured to execute corresponding walking and working; the charging station is configured to provide electricity for or park the robot; the robot system also comprises the signal generating device according to any one of the embodiments above, and the signal generating device is disposed in the charging station and configured to enable the robot to return to the charging station along a signal intensity center of the first radio signal.

In another embodiment, an intelligent working system working in multiple areas, which comprises an automatic walking device, a charging station, a signal emitting module disposed in the charging station and a guide line connected to the signal emitting module; the charging station is configured to provide electricity for or/and park the automatic walking device; at least one guide line is disposed and is configured to divide a working area of the automatic walking device into a plurality of small working areas and guide the automatic walking device to move by radiating a signal to the space; the signal emitting module is configured to selectively electrically switch on the connection with the guide line to transmit a signal to the guide line, and radiate the signal to the space through the guide line, wherein the automatic walking device comprises a signal receiving module, configured to receive the signal radiated to the space by the guide line; a signal recognizing module, configured to recognize a corresponding guide line according to the signal received by the signal receiving module; and a moving module, configured to control the automatic walking device to move to the small working areas divided by the guide line along the guide line recognized by the signal recognizing module to execute a working task.

In another embodiment, a path moving system comprises a mower and a base station and also comprises a first radio signal communication module disposed on the base station and a second radio signal communication module disposed on the mower, wherein the first radio signal emitting module and the second radio signal receiving module transmit a radio signal with each other; a signal emitter disposed on the base station, configured to emit a guide signal; N guide lines connected to the signal emitter, wherein the N guide lines divide the lawn into N+1 mowing areas, and are configured to transmit the guide signal; and a guide signal receiving module disposed on the mower and configured to receive the guide signal, wherein the mower is returned to the base station or arrives at a designated mowing area from the base station for mowing according to the radio signal and the guide signal.

In another embodiment, a wireless charging system for an intelligent mower comprises an emitting module, configured to emit a charging signal; a receiving module, disposed on the intelligent mower and configured to receive the charging signal and charge the intelligent mower; and a location control module, configured to detect a location of the receiving module and control the receiving module to move to a preset range, wherein the receiving module can be charged in the preset range.

In another embodiment, a wireless charging system for an intelligent mower comprises a charging station, provided with a radio electricity emitting module;

an intelligent mower, provided with a radio electricity receiving module and configured to be matched with the wireless electricity emitting module for charging the intelligent mower; and further comprises a guiding module, configured to guide the intelligent mower to move to a charging location, at least two charging locations being disposed, the intelligent mower capable of being charged in any charging location.

In another embodiment, a wireless charging system for an intelligent mower comprises a charging station, the charging station being provided with a wireless electricity emitting module;

an intelligent mower, provided with a wireless electricity receiving module and configured to be matched with the wireless electricity emitting module for charging the intelligent mower; and further comprises a guiding module, configured to guide the intelligent mower to arrive at the charging location along a first direction or second direction, the first direction being different from the second direction.

In another embodiment, a wireless charging system for an intelligent mower comprises a charging station, the charging station being provided with a wireless electricity emitting module;

an intelligent mower, provided with a wireless electricity receiving module and configured to be matched with the wireless electricity emitting module for charging the intelligent mower; and further comprises a guiding module, configured to guide the intelligent mower to arrive at the charging location along a first direction and leave from the charging station along a second direction, the first direction and the second direction being unparallel.

BRIEF DESCRIPTION OF THE DRAWINGS

Same numbers and signs in the drawings and the description are used for representing same or equivalent elements.

FIG. 9 (a) is a schematic diagram of intensity attenuation distribution of a radio signal long a signal line in one embodiment.

FIG. 9 (b) is a schematic diagram of radiation of the signal transmitted in a radio wave manner in the radiation near field region.

FIG. 11 (a) is a waveform schematic diagram before processing of the signal detecting device in FIG. 10.

FIG. 11 (b) is a waveform schematic diagram after processing of the signal detecting device in FIG. 10.

DETAILED DESCRIPTION

Detailed explanation and technical content are described as follows in match with the drawings, however, the appended drawings are merely intended for providing reference and explanation rather than limitation.

Figure 5:
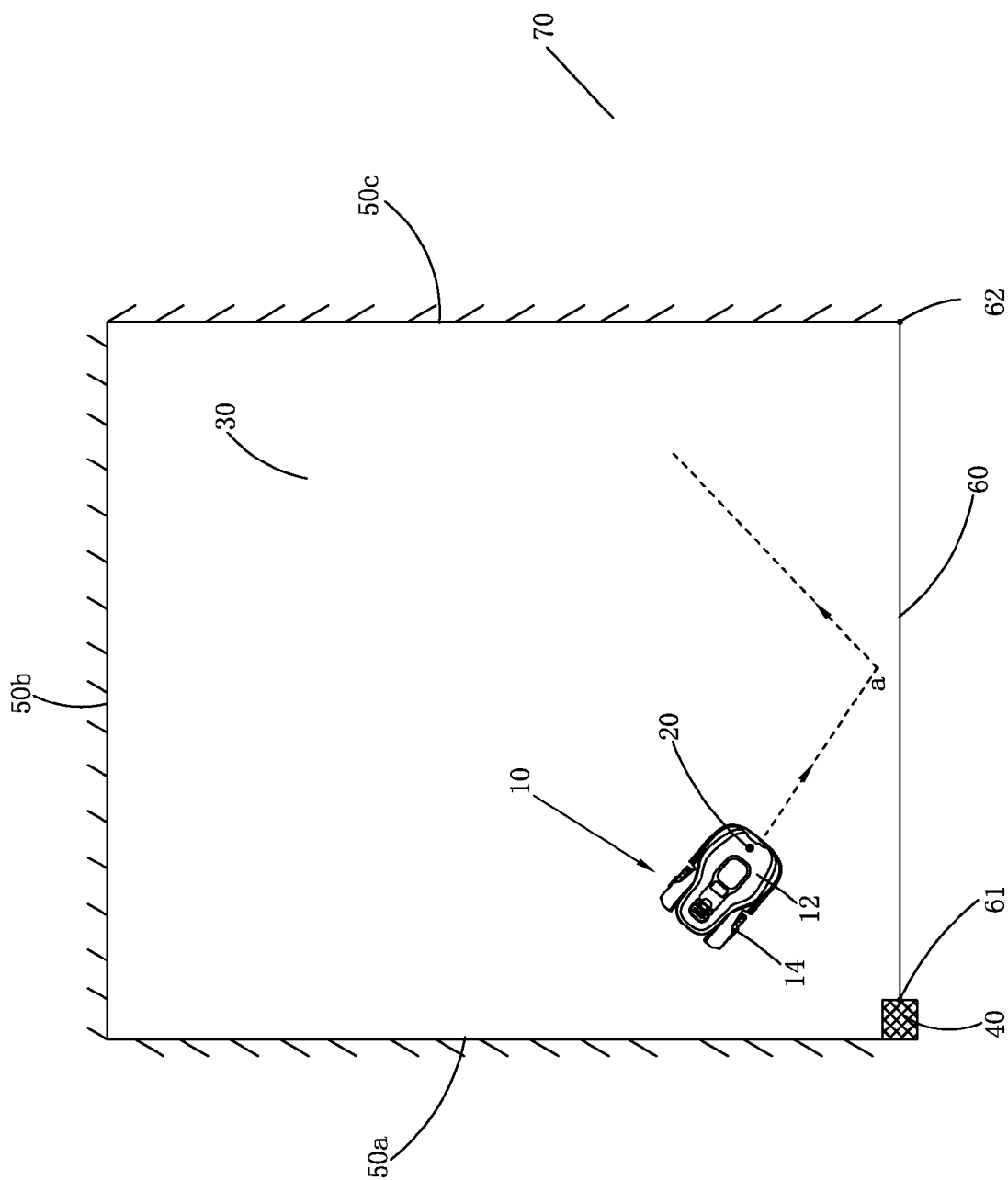
FIG. 5 is a system schematic diagram of a self-moving robot under a working mode of one embodiment.

A self-moving robot system as shown in FIG. 5 comprises a signal generating device 40, a signal line 60 and a self-moving robot 10. In the present embodiment, a start point 61 of the signal line 60 is electrically connected to a signal generating device 40, an endpoint 62 of the signal line 60 is a free end of the signal line 60 and the signal line 60 is a non-closed path. The signal line 60 and the signal generating device 40 do not constitute a circuitry loop, and the signal generating device 40 generates a preset signal SS. The signal line 60 can radiate the preset signal SS to a free space in a radio wave manner.

In the present embodiment, the signal line 60 forms an electronic wall to limit the moving and working of the self-moving robot 10 at one side of the signal line 60. The signal line 60 and obstacle surfaces 50a, 50b and 50c jointly define a working area 30 of the self-moving robot 10. The obstacle surfaces 50a, 50b and 50c comprise an obstacle such as a wall surface, a fence or bush that stops moving of the self-moving robot 10. In the present embodiment, there are three obstacle surfaces 50a, 50b and 50c, as known by those skilled in the art, a specific form of the obstacle surface can be changed according to an actual condition, if more or only two or one or no obstacle surfaces exist, the arrangement of the signal line 60 is adaptively changed according to a manner of the obstacle surface.

In one application scenario, the working area 30 can be formed by surrounding of a plurality of signal lines 60. Each signal line 60 is electrically connected to respective corresponding signal generating device 40.

The self-moving robot 10 can be an intelligent mower or cleaning robot, etc. In the present embodiment, the intelligent mower is taken as an example of the self-moving robot 10. As shown in FIG. 5, the self-moving robot 10 comprise a shell 12, a plurality of wheels 14 located on the bottom of the shell 12, a control unit 80 (not shown) located in the shell 12 and controlling the self-moving robot 10 to automatically work and automatically move, a signal detecting system 20 configured to detect the preset signal SS and a power system (not shown) configured to drive the wheels 14. The power system comprises a battery pack, a transmission mechanism, etc.

Figure 13:
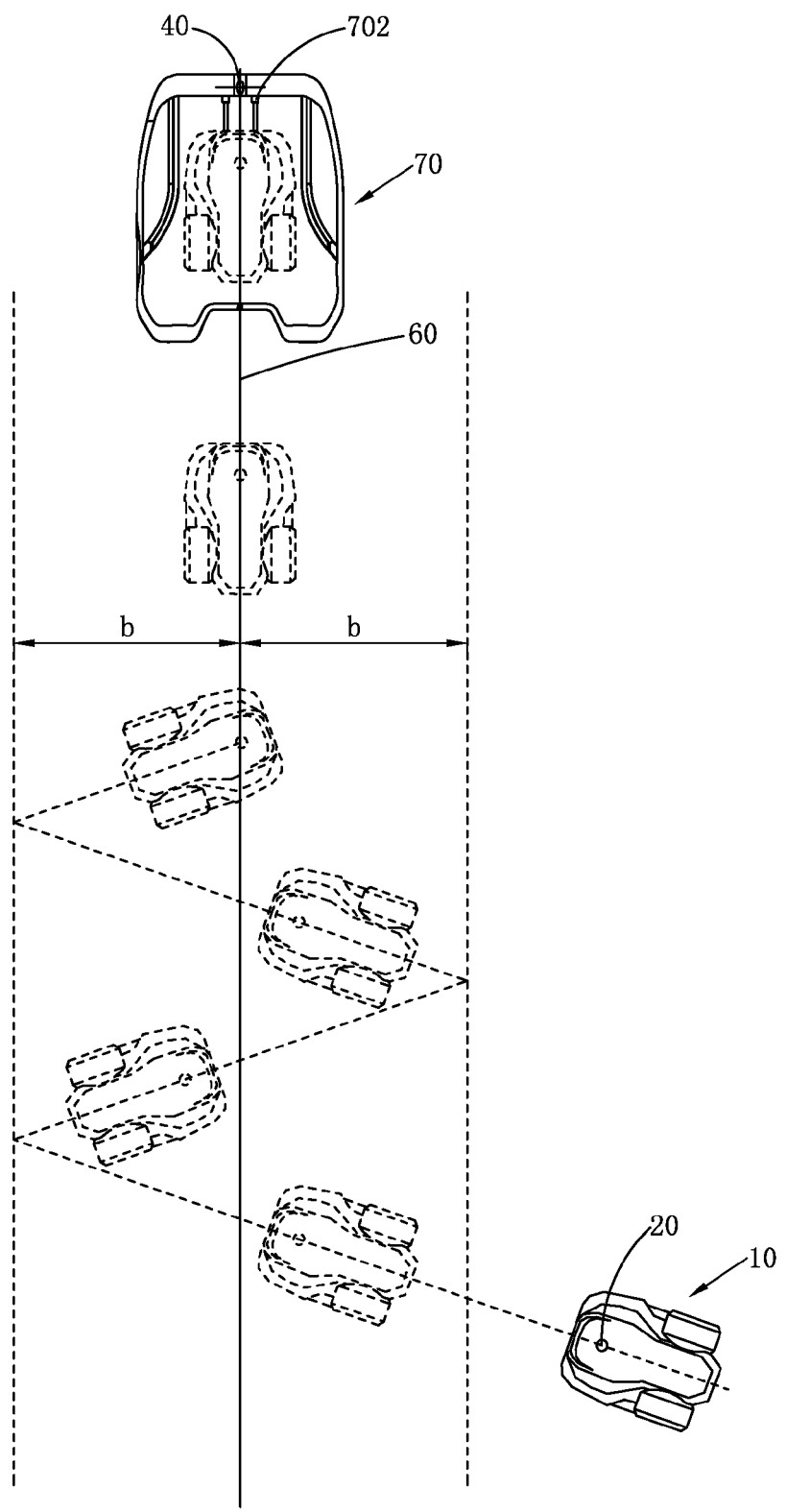
FIG. 13 is a returning schematic diagram of a self-moving robot of one embodiment.

As shown in FIG. 13, in one embodiment, the self-moving robot system comprises a charging station 70. The self-moving robot 10 can return to the charging station 70 to be charged when electricity is lower, or returned to be stayed at the charging station 70 after work is done or when it rains. In the present embodiment, the signal generating device 40 is disposed on the charging station 70. As known by those skilled in the art, the signal generating device 40 may not be disposed on the charging station 70 and only needs to be connected to the charging station 70. For example, the signal generating device 40 is disposed behind or aside or in front of the charging station 70.

The front end of the self-moving robot 10 has at least two butt-jointing terminals (not shown), and the charging station 70 has charging terminals 72 corresponding to the butt-jointing terminals. When the self-moving robot 10 and the charging station 70 are butt-jointed, the butt-jointing terminals are electrically connected to the charging terminals 72.

The charging station 70 has a flat plate 74 for the self-moving robot 10 to park, and the flat plate 74 is flatly paved on a working surface. When the whole self-moving robot 10 is located on the flat plate 74, a problem that the butt-jointing terminals and the charging terminals 72 cannot be butt-jointed since the self-moving robot 10 is inclined caused by unevenness of the working surface is prevented.

In prior art, the border line or guide line needs to be set into a closed circuit to form a circuitry loop with the signal generating device so as to generate a changed magnetic field, and the self-moving robot judges the working area and guides returning by recognizing polarity of the magnetic field. In the present embodiment, the signal line 60 as a border line or guide line does not need to constitute a circuitry loop with the signal generating device, and the self-moving robot judges the working area or guides returning through a communication principle.

The preset signal SS generated by the signal generating device 40 comprises a modulated signal having a characteristic frequency and a carrier signal having a carrier frequency. In one embodiment, the signal generating device 40 is an electric loop per se, and this electric loop can generate the modulated signal and the carrier signal. The signal line 60 is connected to a certain point on the electric loop to freely radiate the modulated signal which is modulated by the carrier signal into a free space in a radio wave manner. According to a radio radiation principle, after the preset signal SS is radiated by the signal line 60, electromagnetic energy carried by the signal will be weakened along with increase of a radiation distance. The signal detecting device 20 on the self-moving robot 10 receives the radio signal existing in the free space in a radio wave manner, recognizes the characteristic frequency of the modulated signal to generate a detection result SS' and transfers the detection result SS' to the control unit 80. The detection result SS' comprises a signal intensity, which is specifically, an intensity value of a signal received by the detecting device 20 and having a frequency as the characteristic frequency. The electromagnetic energy carried by the signal is different, and the corresponding intensity value is also different. The control unit 80 judges a distance between the self-moving robot 10 and the signal line 60 according to the detection result SS'.

When the self-moving robot 10 takes the signal line 60 as a border line, the control unit 80 controls a distance between the self-moving robot 10 and the signal line 60 to be larger than or equal to a first preset distance value, and the self-moving robot automatically moves and works at one side of the signal line 60. Specifically speaking, by controlling the distance between the self-moving robot 10 and the signal line 60 to be larger than or equal to the first distance preset value, the control unit 80 ensures that the self-moving robot 10 always moves and works at one side of the signal line 60, i.e., ensures that the self-moving robot 10 is always in the working area 30.

When the self-moving robot 10 takes the signal line 60 as the guide line, the control unit 80 controls the distance between the self-moving robot 10 and the signal line 60 to be in a preset distance range and the self-moving robot 10 is returned to a preset location along the signal line 60 approximately. Specifically speaking, by controlling the self-moving robot 10 to move along the signal line 60 approximately in a preset distance range of the signal line 60, the control unit 80 ensures that the self-moving robot 10 is returned to the charging station 70.

How the embodiment uses the communication principle to realize judgment on the working area and guide returning by the self-moving robot will be specifically introduced below.

The preset signal SS generated by the signal generating device 40 comprises a modulated signal $f_m(t)$ having a characteristic frequency and a carrier signal $f_c(t)$ having a carrier frequency. The modulated signal $f_m(t)$ is useful information of the preset signal SS, and the signal detecting device 20 recognizes the useful information by the characteristic frequency of the modulated signal. The carrier signal $f_c(t)$ is a high frequency signal in order to transmit the modulated signal in a manner of radio wave effectively. A modulating method for the modulated signal and carrier signal usually comprises frequency modulation and amplitude modulation. Only the amplitude modulation method is taken as an example in the present embodiment to elaborate a process that the signal generating device 40 generates a signal for the signal line 60 to radiate outwards. In the present embodiment, the modulated signal $f_m(t)$ and the carrier signal $f_c(t)$ in FIG. 6 are only examples for elaborating a principle instead of limitation.

Figure 6:
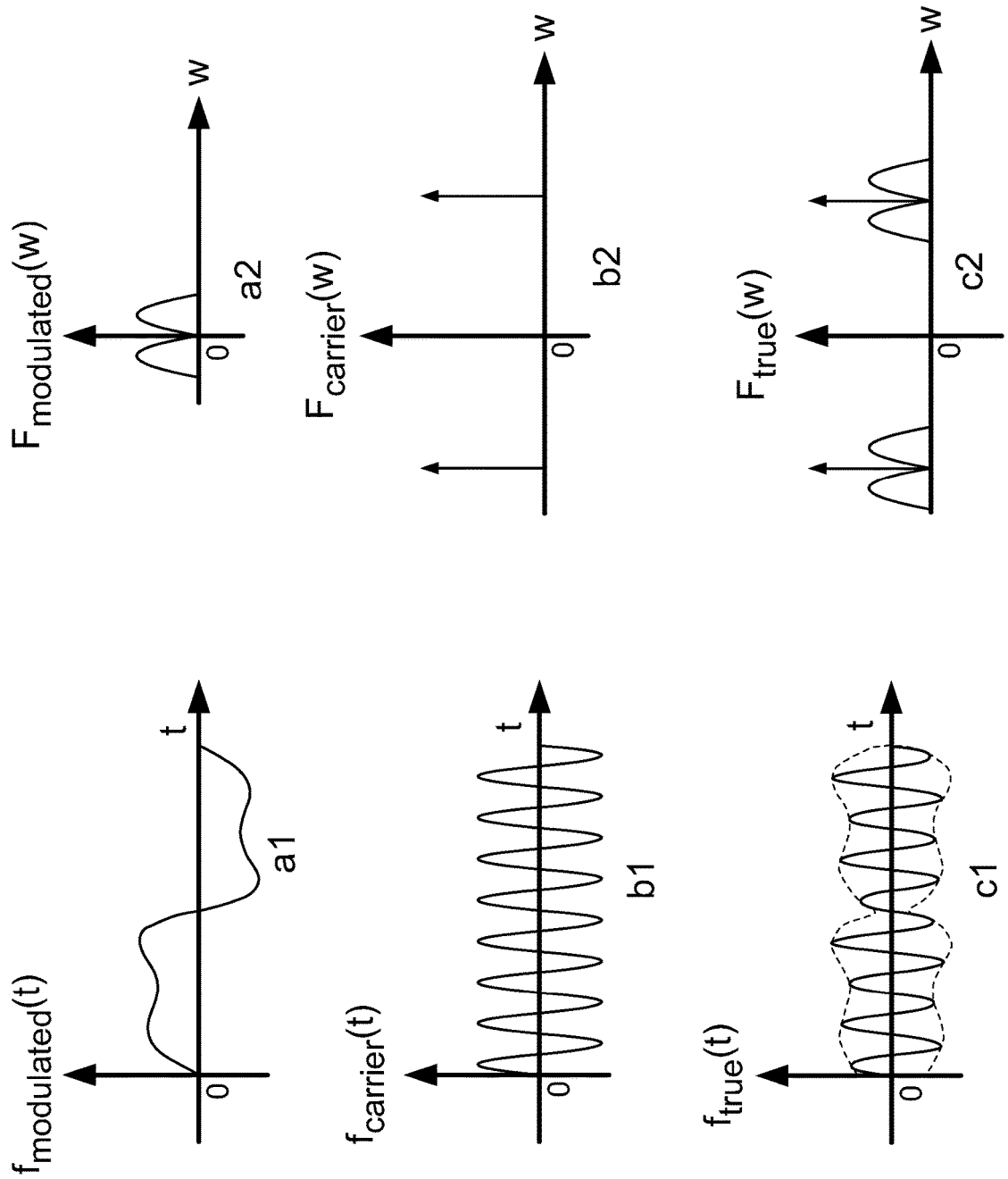
FIG. 6 is a schematic diagram of an amplitude modulation process of a radio signal.

As shown in FIG. 6, FIG. 6(a1) is a schematic diagram that a modulated signal $f_m(t)$ is in a time domain, and FIG. 6(a2) is a schematic diagram of the modulated signal $f_m(t)$ subjected to Fourier transformation $F_m(t)$ in a frequency domain; FIG. 6(b1) is a schematic diagram of the carrier signal $f_c(t)$ in the time domain and FIG. 6(b2) is a schematic diagram of the carrier signal $f_c(t)$ subjected to Fourier transformation $F_c(t)$ in the frequency domain; FIG. 6(c1) is a schematic diagram of a true signal $f_r(t)$ in the time domain after the modulated signal $f_m(t)$ and the carrier signal $f_c(t)$ are subjected to amplitude modulation, and FIG. 6(c2) is a schematic diagram of the true signal $f_r(t)$ subjected to Fourier transformation $F_r(t)$ in the frequency domain. The true signal $f_r(t)$ is a signal which is sent to the start point 61 of the signal line 60 by the signal generating device 40, and the signal line 60 radiates the true signal $f_r(t)$ outwards in a radio wave manner. In the present embodiment, the true signal $f_r(t)$ is the preset signal SS. As known by those skilled in the art, in a realizing process of an actual electronic circuit, the true signal $f_r(t)$ necessarily contains other noise signals. As shown in FIG. 6, the amplitude modulation process is only to transfer a frequency spectrum of the modulated signal to a working frequency suitable for radio wave transmission, and the true signal subjected to amplitude modulation still keeps characteristics of the modulated signal.

As known by those skilled in the art, the complexity and cost of the circuit device generating a high frequency signal are both larger than that generating a low frequency signal. In an application scenario of the present embodiment, the signal sent to the start point 61 of the signal line 60 by the signal generating device needs to meet the conditions that effective transmission can be realized in a radio wave manner and the carried modulated signal is easy for detection by the detecting device 20. Therefore, under the two conditions of meeting the transmission and detection, the simpler the signal sent to the start point 61 of the signal line 60 by the signal generating device 40, the better.

Figure 7:
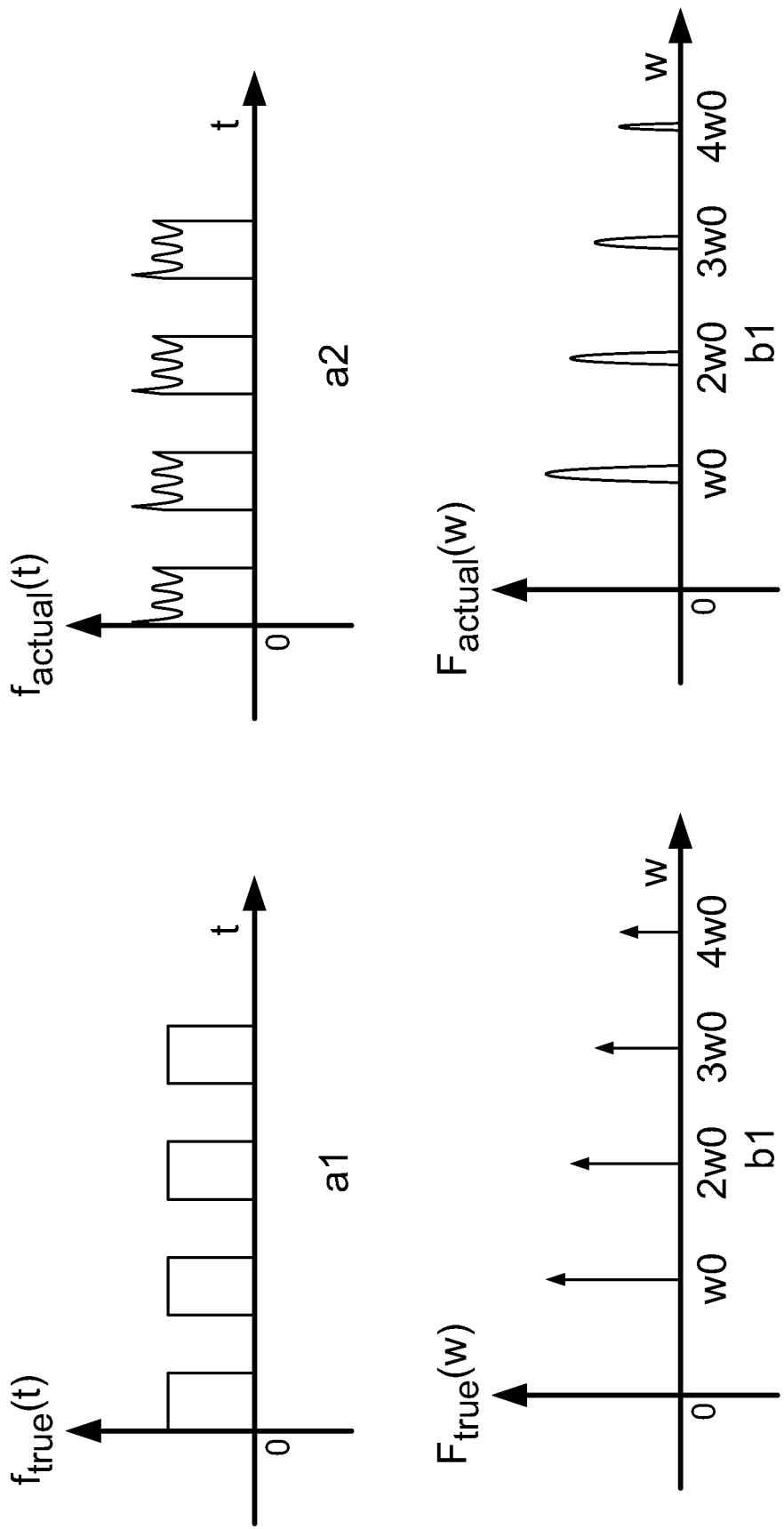
FIG. 7 is a schematic diagram of a preset signal waveform adopted by an embodiment.

It can be known according to Fourier transformation that the shorter rising edge time of the signal in the time domain is, the more the high frequency harmonic wave component contained by the signal is. For the signal of which the rising edge time is shorter, the signal per se is equivalent to be modulated and is suitable to be transmitted in a radio wave manner. In the present embodiment, a specific waveform of the preset signal adopts square wave, that is, a square signal generated by the signal generating device 40. A schematic diagram of the square wave signal in the time domain is as shown in FIG. 7(a1), and a schematic diagram of the square wave signal subjected to the Fourier transmission in the frequency domain is as shown in FIG. 7(b1). Assuming that a base frequency $f_0$ of the selected square wave signal is 15 KHz ($w_0=2\pi f_0$), as shown in FIG. 7(b1), frequencies substantially carried by the square wave signal contain $nf_0$ (n=1, 2, 3, 4, . . . ), i.e., 15 KHz, 30 KHz, 45 KHz, 60 KHz . . . . As known by those skilled in the art, in a process that the signal generating device 40 generates the square wave signal, noise interference inevitably exists (for example, stray inductance and stray capacitance in the electronic circuit). Therefore, a schematic diagram of the square wave signal actually generated by the signal generating device 40 in the time domain is as shown in FIG. 7(a2), and the schematic diagram of the square wave signal through Fourier transmission in the frequency domain is as shown in FIG. 7(b2). As shown in FIG. 7, although the actually generated square wave signal has the noise interference, the carried frequencies still have $nf_0$ (n=1, 2, 3, 4, . . . ). In the present embodiment, the square wave signal contains the modulated signal having the characteristic frequency and the carrier signal. In the present embodiment, the characteristic frequency is base frequency $f_0$, and the frequency of the carrier signal can be considered as one or a plurality of harmonic wave components through which the base frequency signal is effectively transmitted in a radio signal manner. Therefore, the actual square wave signal is still equivalent to the modulated signal and still suitable for transmission in an electromagnetic wave manner.

As known by those skilled in the art, the square wave signal can be replaced with other waveform signals with a fast rising edge, such as trapezoid waves, triangular waves or sawtooth waves. Specifically, a range of the rising edge time of the preset signal only needs to be 100-2000 ns. Preferably, a range of the rising edge time of the preset signal only needs to be 500-2000 ns.

The preset signal SS generated by the signal generating device 40 can be radiated outward through the signal line 60 in a radio wave manner. A transmitting channel adopted by the preset signal SS is a free space. When an SNR of the preset signal is larger than a certain threshold, the signal detecting device 20 on the self-moving robot 1 can detect the preset signal SS existing in a radio signal manner, a signal of which the frequency is same as the characteristic frequency is obtained by a means such as modulation, such that a signal intensity value of the signal having the characteristic frequency can be obtained, the intensity value is used as a detection result to be transmitted to the control unit 80, and the control unit 80 controls the self-moving robot 10 according to the detection result.

As known by those skilled in the art, a transmission manner of the radio signal is really relevant to its carrier frequency. Under an application scenario of the present embodiment, the self-moving robot 10 judges whether it is close to the signal line 60 according to a distance from the signal line 60, and therefore, an effective transmission range of the radio signal is necessarily limited in the free space nearby the signal line 60. In the embodiment, the signal line 60 radiates a true signal toward the free space in a radio wave manner, which usually contains a modulated signal having useful information, a carrier signal for radiation and inevitable noise signals. Therefore, the frequency of the used carrier signal needs to be selected. Table 1 lists names of used radio wave bands and corresponding wave bands and frequency bands used in the field of communication, and also lists frequency bands used by different wired and radio channels. As shown in Table 1, radio waves of all frequency bands can be transmitted in the free space.

TABLE 1

Frequency band division and working frequency range of common channels

| Wave band name | | Wavelength | Frequency band | | Transmission medium | | | | |
|---|---|---|---|---|---|---|---|---|---|
| | | | | | Wired channel | | Radio channel | | |
| Very long wave | | 1000-100 km | 0.3-3 kHz | Over head line | | | Sea water | Earth surface layer | Free space |
| Superlong wave | | 100-10 km | 3-30 kHz | | Symmetric cable | | | | |
| Long wave | | 10-1 km | 30-300 kHz | | | | | Ionic layer | |
| Medium wave | | 1000-200 m | 0.3-1.5 MHz | | | Coaxial cable | | | |
| Shortwave | | 200-10 m | 1.5-30 MHz | | | | | | |
| Ultrashort wave | Metre wave | 10-1 m | 30-300 MHz | | | Waveguide cable | | | |
| Microwave | Decimetric wave | 100-10 cm | 0.3-3 GHz | | | | | | |
| | Centimetric wave | 10-1 cm | 3-30 GHz | | | | | | |
| | Millimeter wave | 10-1 mm | 30-300 GHz | | | | | | |
| | Submmillimeter wave | 1-0.1 mm | 300-3000 GHz | | | | | | |
| Optical wave | Long wavelength | 1.25-1.6 um | | | | | | | |
| | Shortwave length | 0.8-0.9 um | | | | | | | |

Figure 8:
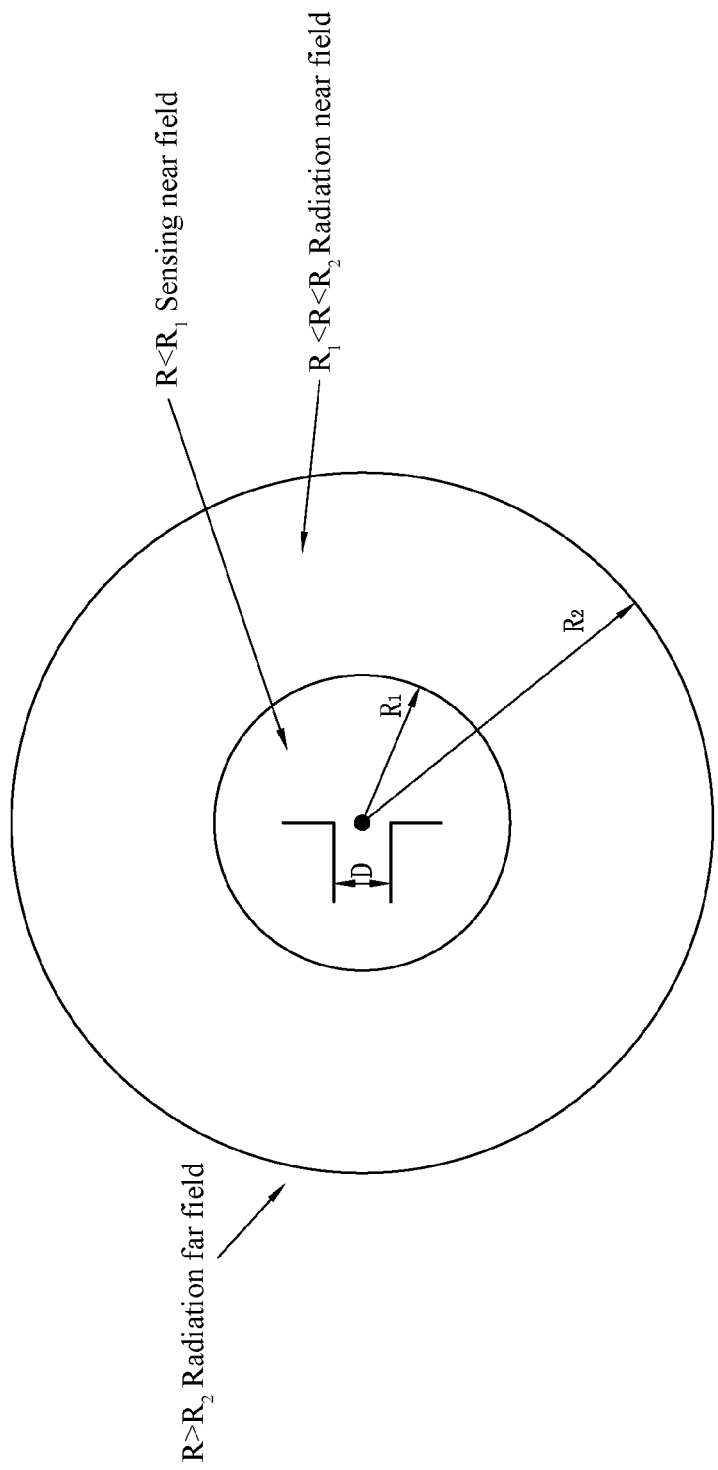
FIG. 8 is a distribution schematic diagram of an antenna radiation area.

In the present embodiment, radiation of the radio signal by the signal line 60 is realized in view of an antenna radiation electromagnetic field principle in the field of communication. As known by those skilled in the art, a space electromagnetic field radiated by an antenna can be divided into three areas: a sensing near field, a radiation near field and a radiation far field. As shown in FIG. 8, they are differentiated depending on different distances away from the antenna. The structures of electromagnetic fields in the junctions of these fields are not suddenly changed, but viewed from a whole, the electromagnetic fields in these three areas have different characteristics. The electromagnetic characteristic of the sensing near field region is no generation of radiation, the electromagnetic characteristics of the radiation sensing near field region are generation of the radiation but very fast attenuation of radiated electromagnetic energy, and the electromagnetic characteristic of the radiation far field is effective radiation of the electromagnetic energy. Sizes of distribution ranges of the three areas can be controlled through a relationship between a length of the antenna and wavelengths of radiated radio waves.

In the present embodiment, the signal line 60 adopts the radiation near field region as the radiation area of the true signal transmitted in a radio wave manner. As shown in FIG. 8, the distribution range of the radiation near field region is, $$R < R_2 = \frac{\lambda}{2\pi}.$$

wherein, λ is wavelength of the radiated true signal. The electromagnetic characteristic of the radiation near field region is very fast attenuation of the radiated electromagnetic energy. An attenuation characteristic of the signal line 60 for radiation of the signal transmitted in a radio wave manner in the radiation near field region is as shown in FIG. 9(b), energy H of the radio signal is fast decreased progressively to the periphery from the signal line 60 as a center. When a range a is exceeded, since the energy H of the radiated radio signal is too little, and a signal noise ratio is too small, the signal detecting device 20 cannot detect such signal. As shown in FIG. 9(a), the signal detecting device 20 can effectively detect the signal only when a distance between both sides of the signal line 60 is in the range a.

In the embodiment, a value a in the range a of the distance between both sides of the signal line 60 is predetermined according to an actual application scenario. For example, the value a is determined according to a width of the self-moving robot 10, for example, a=10 cm, 15 cm, 20 cm, etc. The range of the value a does not limit the present embodiment. After the value a is determined, the frequency of the true signal generated by the signal generating device 40 can be obtained by calculation. A specific calculation process is as follows.

A farthest distance $$\frac{\lambda}{2\pi}$$

of the radiation near field region is hundreds times N of the effective radiation range a, for example, N=100, 150, 200, 300, etc. A specific value of N can be adaptively adjusted according to an actual application scenario. Specifically speaking, different N values correspond to a flexibility of the signal transmitted in a radio manner and received by the signal detecting device. According to $$Na = \frac{\lambda}{2\pi},$$

it can be deferred that a wavelength of the true signal is λ. According to the relationship $$f = \frac{c}{\lambda}, c = 3 \times 10^8 m/s,$$

between the wavelength of the true signal and the frequency, if the wavelength λ of the true signal is determined, then the frequency f of the true signal is determined. Since in the process that the true signal is transmitted in the radio manner, the carrier signal plays a decisive role in a radiated range of the signal, the frequency obtained by such calculation method can be considered as the frequency of the carrier signal. Under the actual application scenario, a range of the carrier frequency selected by the present embodiment is smaller than or equal to 10 MHz, and smaller than or equal to 2 MHz preferably. In the actual engineering application, the carrier frequency of the carrier signal is at least lager than or equal to the characteristic frequency of the modulated signal by 10 times. Therefore, the used characteristic frequency can be approximately estimated after the frequency range of the carrier signal is determined. In the present embodiment, a range of the characteristic frequency is 100 HZ-500 KHz, and preferably 100 HZ-50 KHZ.

Figure 10:
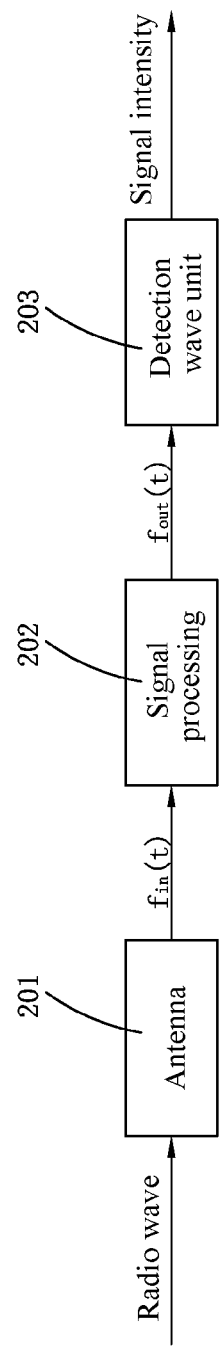
FIG. 10 is a module schematic diagram of a signal detecting device in one embodiment.

FIG. 10 shows a modular schematic diagram of the signal detecting device 20. The signal detecting device 20 comprises an antenna 201, a signal processing circuit or signal processing chip 202 connected to the antenna 201 and a detection wave unit 203 detecting a signal intensity. The antenna 201 converts the radio signal existing in the free space in a radio wave manner into an input signal $f_{in}(t)$. The signal processing unit or signal processing chip 202 performs a series of processing such as frequency conversion processing, medium frequency amplification, filtering (demodulation), AGC amplification or power amplification on the input signal GM), therefore, an output signal $f_{out}(t)$ of which the frequency is consistent with the characteristic frequency of the modulated signal is obtained. The detection wave unit 203 detects an intensity of the output signal $f_{out}(t)$. Since the signal processing can be realized by some conventional means known by those skilled in the art, technicians can freely design or select as required, and therefore, the present embodiment is not repeated.

A waveform of $f_{in}(t)$ before processing of the signal detecting device 20 is as shown in FIG. 11(a), and $f_{out}(t)$ after processing is as shown in FIG. 11(b). As shown in FIG. 11(a), the $f_{in}(t)$ waveform approximately accords with a waveform shape of the true signal generated by the signal generating device 40. The signal processing circuit or signal processing chip 202 processes $f_{in}(t)$ to filter signal $f_{out}(t)$ of which the frequency is equal to the characteristic frequency. The detection wave unit 203 counts a quantity G of the waveforms having the frequency characteristic in unit time, and transmits the quantity G as a signal intensity to the control unit 80. The signal intensity can be obtained in other calculation manners: for example, the output signal $f_{out}(t)$ is subjected to Fourier transformation, and an amplitude value result in the corresponding characteristic frequency after Fourier transformation is taken as the signal intensity. As shown in FIG. 9, energy H of the radio signal is attenuated toward two sides from the signal line 60 as the center, thus, the signal intensity value G detected by the detection wave unit 203 is also decreased progressively toward two sides from the signal line 60 as the center.

In the present embodiment, a fixed frequency in a selectable frequency band is selected as the characteristic frequency of the modulated signal. In another embodiment, a plurality of fixed frequencies in a selectable frequency band are selected as the characteristic frequency of the modulated signal.

In one embodiment, the self-moving robot 10 can be provided with a plurality of signal detecting devices 20. As shown in FIG. 11, the self-moving robot 10 is provided with two signal detecting devices 20, including a first signal detecting device 21 and a second signal detecting device 22. The first signal detecting device 21 and the second signal detecting device 22 are respectively located at symmetric left and right sides of the middle axis of the two butt-jointing terminals. When the two butt-jointing terminals are located in the middle part of the self-moving robot 10, the first signal detecting device 21 and the second signal detecting device 22 are respectively located at symmetric left and right sides of the middle axis of the self-moving robot 10.

In one embodiment, positions of the signal generating device 40 and the signal detecting device 20 can be interchanged. The signal detecting device 20 is connected to the signal line 60, and the signal generating device 40 can be located on the self-moving robot 10. In the present embodiment, the signal detecting device 20 is further connected to a wireless communication device T1, and the another radio communication device T2 disposed on the self-moving robot 10 is connected to the control unit 80. When the self-moving robot 10 approaches to the signal line 60, a signal generated by the signal generating device 40 can be detected by the signal detecting device 20 through the signal line 60, the radio communication device T1 connected to the signal detecting device 20 sends a detected signal intensity G to the radio communication device T2 on the self-moving robot 10, and the radio communication device T2 sends the signal intensity G to the control unit 80. The radio communication device can adopt an infrared communication device, a WiFi device, a cellular mobile communication device, a Bluetooth device, a GPS device, a ZigBee device, a 2.4 GHZ radio communication device, a 433 MHZ radio communication device or Z-Wave radio communication device. In the present embodiment, a detection result of the radio signal SS is transmitted to the control unit 80 through a radio communication manner. As known by those skilled in the art, the detection result of the radio signal SS can also be transmitted to the control unit 80 in other transmission manners.

In one embodiment, the self-moving robot system can be configured with two sets of signal generating devices and signal detecting devices. One set of signal generating device and signal detecting device constitutes a system detecting a distance away from the signal line 60, and the other set of signal generating device and signal detecting device is configured to transmit the detection result of the radio signal SS to the control unit 80. The self-moving robot is provided with a first signal generating device and a second signal detecting device, the signal line 60 is connected to the first signal detecting device, and the signal line 60 receives a preset signal generated by the first signal generating device. The signal line 60 is further connected to the second signal generating device, and the signal line 60 radiates a preset signal generated by the second signal generating device. The first signal generating device and the second signal generating device are configured to generate preset signals of different frequencies, the first signal detecting device is configured to detect the preset signal generated by the first signal generating device, and the second signal detecting device is configured to detect the preset signal generated by the second signal generating device.

The self-moving robot system described above can also be defined in a manner described below. The self-moving robot system comprises a self-moving robot 10, a radio system and a signal line 60. The radio system comprises a radio signal generating device and a radio signal detecting device, the radio signal generating device corresponds to the signal generating device 40 above, and the radio signal detecting device corresponds to the signal detecting device 20 above. The signal line 60 can singly serve as a border line for planning the working area of the self-moving robot 10 for use, and can also singly serve as a guide line for guiding the self-moving robot 10 to return to a certain preset position, or the same one signal line 60 serves as a border line for use when the self-moving robot 10 is under the working mode and serves as a guide line for use when the self-moving robot 10 is under the returning mode. In the self-moving robot system, the signal line 60 not only can serve as the border line or/and guide line of the self-moving robot system, but also plays a role similar to a receiving antenna or/and emitting antenna in the radio system.

Specific application embodiments have many modes, in one embodiment, the signal line 60 is connected to the radio signal generating device, and the emitting antenna as the radio signal generating device converts the signal generated by the radio signal generating device into a manner of radio waves to transmit to the free space. The radio signal detecting device is disposed on the self-moving robot 10, and is configured to detecting the radio waves.

In one embodiment, the signal line 60 is connected to the radio signal detecting device, and the receiving antenna as the radio signal detecting device converts the signal existing in the free space in the radio wave manner into an electric signal to transmit to the radio signal detecting device. The radio signal generating device is disposed on the self-moving robot 10, and is configured to emit the radio waves.

In one embodiment, the signal line 60 is connected to the radio signal detecting device, and further connected to the radio signal generating device. When in different time periods, the signal line 60 respectively serves as a receiving antenna of the radio signal detecting device and the emitting antenna of the radio signal generating device. The self-moving robot 10 is also provided with a radio signal detecting device and a radio signal generating device.

In the embodiment above, the signal line 60 and the radio signal generating device or/and the radio signal detecting device connected thereto can be arranged in different locations of the working area according to demands of a user, such that the signal line 60 plays a corresponding role in the self-moving robot system. When needing to use the signal line 60 as the border line, the user only needs to arrange the signal line 60 in a set border location; and when needing to use the signal line 60 as the guide line, the user only needs to arrange the signal line 60 in a path needing to be guided.

How the self-moving robot under the working mode judges the working area through a border algorithm in an embodiment is specifically explained below.

In one embodiment, the signal generating device 40 is electrically connected to the signal line 60, and the self-moving robot 10 is provided with a signal detecting device 20. The signal generating device 40 generates a radio signal SS of certain frequency, and the signal detecting device 20 located on the self-moving robot 10 detects the generated radio signal SS. A first preset threshold $G_f$ related to an intensity of the radio signal SS is disposed in the control unit 80, when the intensity G of the radio signal SS detected by the signal detecting device 20 reaches a first preset threshold $G_f$, the control unit 80 controls the self-moving robot 10 to move to a direction in which the intensity of the preset signal is weakened.

In the embodiment of actual application, the size of the first preset threshold $G_f$ can be determined according to a maximal intensity value generated by a signal generator 40 and/or by controlling a minimal distance of the signal line 60 controlling the self-moving robot 10. In one specific embodiment, a square wave signal SS of 15 KHz is generated by the signal generating device 40, and a maximal value $G_{max}$ of the signal intensity of the signal line 60 is 40. By referring to FIG. 9(b), it can be known that the value of a corresponding farthest range a is 20 cm, and the signal intensity value detected by the signal detecting device 20 in this position is 5. When in actual application, if the minimal distance from the self-moving robot 10 to the signal line 60 is allowed to be 10 cm, by referring to FIG. 9(b), it can be known that a first preset threshold $G_f$ corresponding to the distance of 10 cm is 20 by referring to FIG. 9(b).

Figure 12:
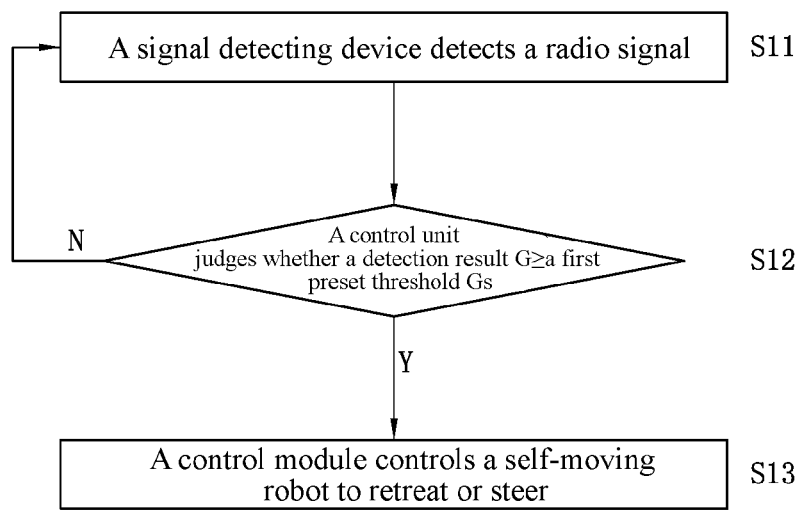
FIG. 12 is a flow chart of a border algorithm of an embodiment as shown in FIG. 5.

A specific border algorithm flow is as shown in FIG. 12.

Step S1: causing the self-moving robot 10 to move and work randomly or according to a preset track under a working mode, and always detecting a radio signal by the signal detecting device 20 and entering step S2.

Step S2: comparing the signal intensity G of the detection result with the first preset threshold $G_0$ by the control unit 80, entering step S3 when the signal intensity value G detected by the signal detecting device 20 is larger than or equal to $G_0$, otherwise, continuously returning to step S1.

Step S3: controlling the self-moving robot 10 to retreat or steer by the control unit 80 to be deviated from an original moving direction.

A specific moving process of the self-moving robot 10 is as shown in FIG. 5. When the self-moving robot 10 is moved to a position a along a path shown by a virtual line with an arrow, the signal detecting device 20 detects that the signal intensity G is larger than or equal to $G_f$. The control unit 80 controls the self-moving robot 10 to steer and deviate from an original moving direction and not approach to the signal line 60 any more.

In one embodiment, the signal generating device 40 is electrically connected to the signal line 60, the self-moving robot 10 is provided with two signal detecting devices 20. When any one signal detecting device detects that the intensity value of the radio signal reaches $G_f$, the control unit 80 sends a retreating command or steering command to control the self-moving robot to not approach to the signal line 60 any longer. When the intensity value of the radio signal detected by the first signal detecting device 21 located on the left is larger than $G_f$, it is indicated that the left side of the self-moving robot 10 is closer to the signal line 60, and the control unit 80 controls the self-moving robot 10 to steer rightwards or retreat; and when the intensity value of the radio signal detected by the second signal detecting device 22 located on the right is larger than $G_f$, it is indicated that the right side of the self-moving robot 10 is closer to the signal line 60, and the control unit 80 controls the self-moving robot 10 to steer leftwards or retreat.

In one embodiment, the signal detecting device 20 is electrically connected to the signal line 60, and the self-moving robot 10 is provided with a signal generating device 40. Positions of the signal generating device 40 and the signal detecting device 20 in the present embodiment are interchanged, only one communication device for transmitting a detection result needs to be matched, no influence is generated on the border algorithm for judging whether the self-moving robot is in the working area and it thus not repeated in detail.

Further, the control unit 80 can record a series of intensity values $G_N$ (N=1, 2, 3, 4, 5 . . . ) of the radio signal SS detected by the signal detecting device 20. When the signal detecting device 20 detects a second intensity value, the control unit 80 compares the intensity value $G_N$ at the present moment with the intensity value $G_{N-1}$ at the last moment, and then whether the retreating or steering command sent from the control unit 80 can effectively enable the self-moving robot to not approach to the signal line 60 can be judged, and the sent command can be adjusted. Specifically, when the intensity value $G_N$ at the present moment is smaller than the intensity value $G_{N-1}$ at the last moment, the control unit 80 judges that the sent signal is effective; and when the intensity value $G_N$ at the present moment is larger than the intensity value $G_{N-1}$ at the last moment, the control unit 80 judges that the sent signal is ineffective, and controls the self-moving robot 10 to move again by adjusting a steering angle or retreating distance.

The control unit 80 counts a series of intensity values G in the same time period, and can judge whether the self-moving robot 10 crosses over the signal line 60. Specifically, when the series of intensity values G in the same time period reach a maximal intensity value $G_{max}$ on the signal line 60 or reaches a threshold $G_f$ twice, then the control unit 80 judges that the self-moving robot 10 crosses over the signal line 60, and is in the nonworking area.

How the self-moving robot in a returning mode is returned to a charging station through a guide algorithm in an embodiment is specifically explained below.

In the first embodiment, the charging station 70 is provided with a signal generating device 40, which is electrically connected to the signal line 60, and the self-moving robot 10 is provided with a signal detecting device 20. The signal generating device 40 generates a radio signal SS of certain frequency, and the signal detecting device 20 located on the self-moving robot 10 detects the generated radio signal SS. As shown in FIG. 13, in order to conveniently control returning, the signal detecting device 20 in the present embodiment is disposed on the middle axis of the self-moving robot 10. As known by those skilled in the art, the signal detecting device 20 can also be disposed in other positions of the self-moving robot 10 as long as the returning control method is adaptively changed.

Figure 14:
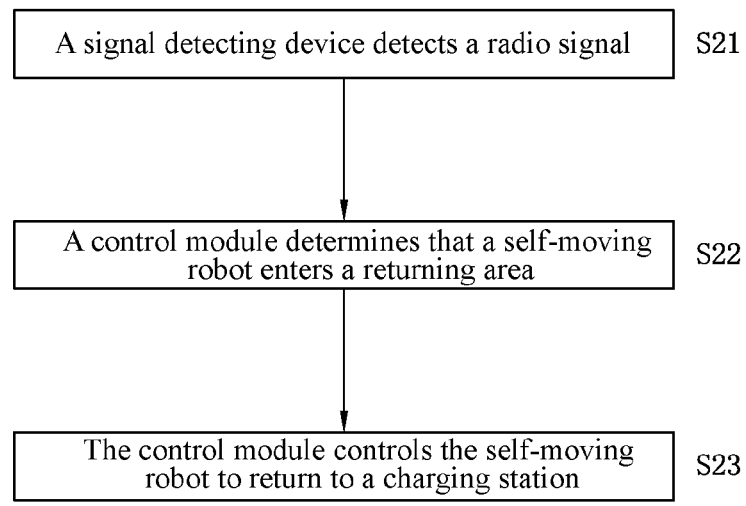
FIG. 14 is a flow chart of a returning algorithm of an embodiment as shown in FIG. 13.

In this embodiment, steps of a control method after the self-moving robot 10 receives the returning command are as shown in FIG. 14.

Step S21: the self-moving robot 10 under the returning mode seeks for the signal line 60 randomly or according to a preset track. The signal detecting device 20 detects the radio signal SS.

Step S22: the control unit 80 judges whether the self-moving robot 10 enters a returning area according to the intensity value G of the detection result SS' of the signal detecting device 20.

The control unit 80 presets a second preset threshold $G_s$ related to signal intensity, it can be known by referring to FIG. 9(b) that the second preset threshold $G_s$ corresponds to a distance b away from the signal line 60. A preset relationship exists between the size of the second preset threshold $G_s$ and the maximal intensity value $G_{max}$ of the radio signal SS generated by the signal generating device 40, for example $G_s = \alpha G_{max}$, ($\alpha < 1$). Different second thresholds $G_s$ represent different distances b to the signal line 60. The user can determine the value of times $\alpha$ according to the value b in an actual working condition, and generally the range of the times is $0.15 \leq \alpha \leq 0.75$.

If the intensity value G of the result SS' is larger than or equal to $G_s$, then it is indicated that the self-moving robot 10 has entered the returning area, and then step S23 is entered; if the intensity value G of the result SS' is smaller than $G_s$, then it is indicated that the self-moving robot 10 does not enter the returning area yet, the control unit 80 controls the self-moving robot 10 to continuously to move randomly, and then step S21 is entered.

Step 23: the control unit 80 controls the self-moving robot 10 to return to the charging station 70 circuitously under the state as shown in FIG. 13 which takes the signal line 60 as the center by ensuring that the intensity value G of the detection result SS' of the signal detecting device 20 is always larger than or equal to the second preset threshold $G_s$.

When the self-moving robot 10 is returned according to the steps above, if the signal detecting device 20 suddenly cannot effectively detect the radio signal SS or the signal intensity detected by the signal detecting device 20 is always in a progressive decrease state, then the control unit 80 judges that the self-moving robot 10 advances along a direction in which the signal line 60 gets away from the charging station 70, and the control unit 80 controls a direction of the self-moving robot 10 to be overturned by 180°, and controls the self-moving robot 10 to be continuously returned according to the steps above.

As known by those skilled in the art, the steps and logic judgment conditions in the steps above can be adaptively modified, such that the self-moving robot 10 can return to the charging station 70.

Figure 15:
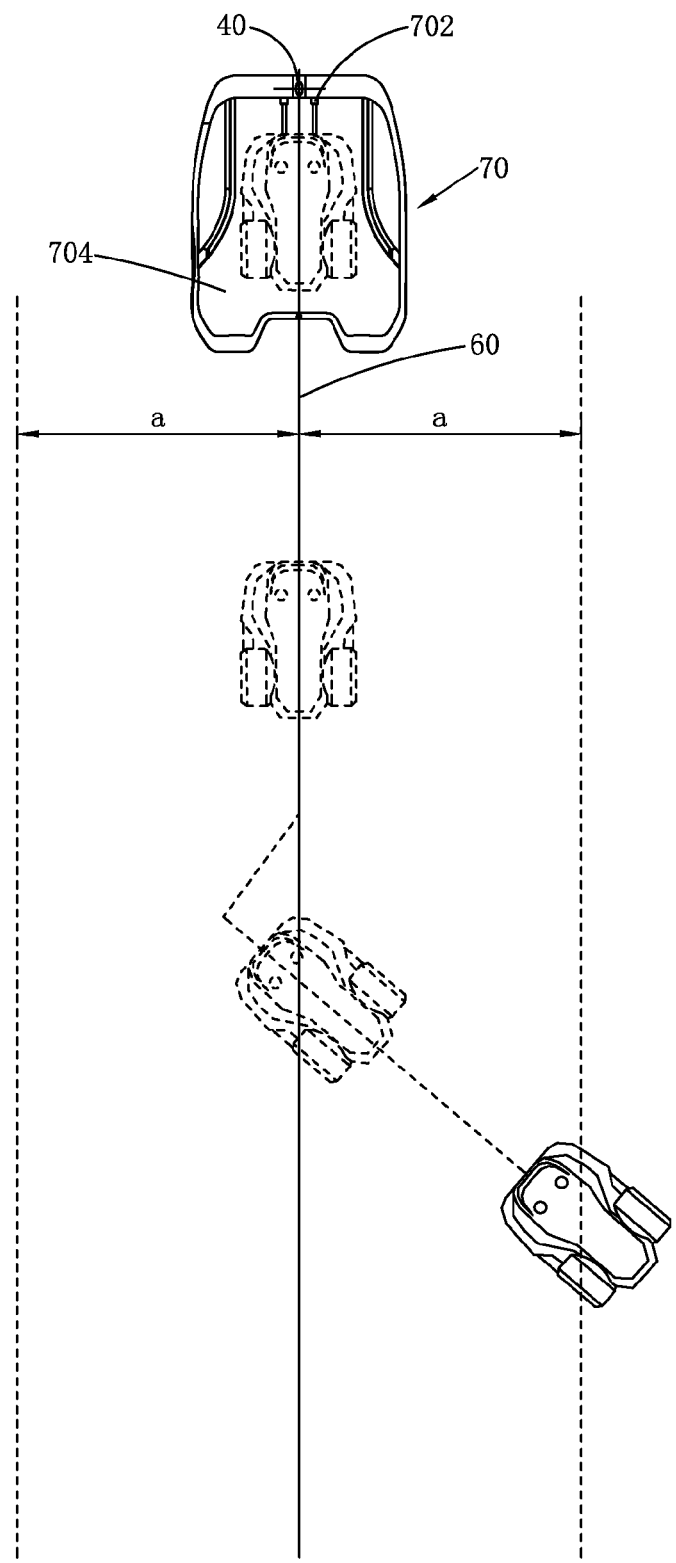
FIG. 15 is a line-crossing returning schematic diagram of a self-moving robot of another embodiment.

In one embodiment, as shown in FIG. 15, the charging station 70 is provided with the signal generating device 40, which is electrically connected to the signal line 60, and the self-moving robot 10 is provided with two signal detecting devices, including a first signal detecting device 21 and a second signal detecting device 22. A direction in which the self-moving robot 10 normally advances is defined as the front of the self-moving robot 10, and one direction opposite to the front is the back of the self-moving robot 10, and based on the defined front and back of the self-moving robot 10, the self-moving robot 10 also comprises left and right sides located between the front and back. The first signal detecting device 21 and the second signal detecting device 22 are respectively located on symmetric left and right sides of the middle axis of the self-moving robot 10.

Figure 16:
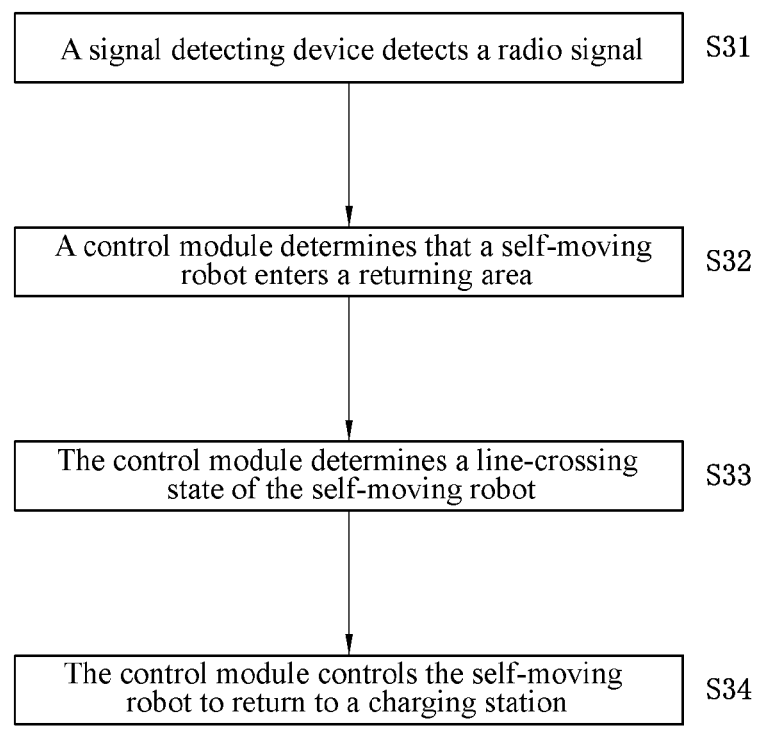
FIG. 16 is a flow chart of a returning algorithm of an embodiment as shown in FIG. 15.

In the present embodiment, steps of a guide algorithm after the self-moving robot 10 receives a returning command are as shown in FIG. 16.

Step S31: the self-moving robot 10 under a returning mode seeks for the signal line 60 randomly or according to a preset track. The first signal detecting device 21 and the second signal detecting device 22 detect an intensity value G1 and an intensity value G2 of the radio signal SS.

Step S32: the control unit 80 judges whether the self-moving robot enters a returning area according to detection results of the first signal detecting device 21 and the second signal detecting device 22.

The detection result of the first signal detecting device 21 is a first result $SS_1'$, and a corresponding intensity value is G1, the detection result of the second signal detecting device 22 is a second result $SS_2'$, and a corresponding intensity value is G2. The control unit 80 presets a second preset threshold $G_s$ related to the signal intensity, by referring to FIG. 9(b), it can be known that the second threshold $G_s$ corresponds to a distance b away from the signal line 60. A preset relationship exists between the size of the second preset threshold $G_s$, and the maximal intensity value $G_{max}$ of the radio signal SS generated by the signal generating device 40, for example $G_s = \alpha G_{max}$, ($\alpha<1$). Different intensity thresholds $G_s$ represent different distances b to the signal line 60. A user can determine the value of times α by using the value b in the actual working condition, and generally a range of the times is $0.15 \leq \alpha \leq 0.75$.

If the intensity value G1 of the first result $SS_1'$ and the intensity value G2 of the second result $SS_2'$ are both smaller than the second preset threshold $G_s$ set in the control unit 80, then it is indicated that the self-moving robot 10 does not enter the returning area yet. The control unit 80 controls the self-moving robot 10 to continuously move, and returns back to step S31 to continuously detect the radio signal SS.

If the intensity value G1 of the first result $SS_1'$ is larger than or equal to the second preset threshold $G_s$ and the intensity value G2 of the second result $SS_2'$ is smaller than the second preset threshold $G_s$, then it is indicated that the left side of the self-moving robot 10 enters the returning area. The control unit 80 controls the self-moving robot 10 to advance leftwards in differential velocity or turn left to advance and continues the step S32.

If the intensity value G1 of the first result $SS_1'$ is smaller than the second preset threshold $G_s$ but the intensity value G2 of the second result $SS_2'$ is larger than or equal to the second preset threshold $G_s$, then it is indicated that the right side of the self-moving robot enters the returning area. The control unit 80 controls the self-moving robot 10 to advance rightwards in differential velocity or turn right to advance and continues the step S32.

If the intensity value G1 of the first result $SS_1'$ and the intensity value G2 of the second result $SS_2'$ are both larger than the second preset threshold $G_s$, then it is indicated that the self-moving robot 10 has entered the returning area. The control unit 80 controls the self-moving robot 10 to continuously move along the original direction, and step S33 is entered.

Step S33: the control unit 80 judges whether the self-moving robot 10 is in a line-crossing state according to the first detection result $SS_1'$ and the second result $SS_2'$.

If the intensity value G1 of the first detection result $SS_1'$ reached the range (e.g. from 95% of $G_{max}$ to $G_{max}$) of the maximal intensity value $G_{max}$ of the radio signal SS generated by the signal generating device 40 and the intensity value G1 of the first detection result $SS_1'$ is in a decrease trend, then it is indicated that the self-moving robot 10 is in a line-crossing state already, and step S34 is entered. Otherwise, Step S33 is returned.

Step S34: the control unit 80 determines that the self-moving robot 10 is returned to the charging station 70 along the signal line 60 according to an intensity difference value between the first detection result $SS_1'$ and the second result $SS_2'$.

If a difference between the intensity value G1 of the first detection result $SS_1'$ and the intensity value G2 of the second result $SS_2'$ is $|G1-G2| \leq G_\nabla$, then it is indicated that the self-moving robot 10 is returned along the signal line 60. $G_\nabla$ is a preset threshold range, and controls a left and right deviation range of the self-moving robot 10. The control unit 80 controls the self-moving robot 10 to continuously move along the original direction till the self-moving robot 10 is butt-jointed with the charging station 70.

If a difference between the intensity value G1 of the first detection result $SS_1'$ and the intensity value G2 of the second result $SS_2'$ is $G1-G2>G_\nabla$, then it is indicated that the self-moving robot 10 is deviated to the left side of the signal line 60. The control unit 80 controls the self-moving robot 10 to slightly rotate rightwards or move rightwards in differential velocity till the self-moving robot 10 is butt-jointed with the charging station 70.

If a difference between the intensity value G1 of the first detection result $SS_1'$ and the intensity value G2 of the second result $SS_2'$ is $G1-G2<-G_\nabla$, then it is indicated that the self-moving robot 10 is deviated to the right side of the signal line 60. The control unit 80 controls the self-moving robot 10 to slightly rotate leftwards or move leftwards in differential velocity till the self-moving robot 10 is butt-jointed with the charging station 70.

When the self-moving robot 10 is returned according to the steps above, if the signal detecting device 20 suddenly cannot effectively detect the radio signal SS or the signal intensity detected by the signal detecting device 20 is always in a progressive decrease state, then the control unit 80 judges that the self-moving robot 10 advances along the signal line 60 in a direction away from the charging station 70, and the control unit 80 controls a direction of the self-moving robot 10 to be overturned by 180°, and controls the self-moving robot 10 to be continuously returned according to the steps above.

As known by those skilled in the art, the steps and logic judgment conditions in the steps above can be adaptively modified, such that the self-moving robot 10 can return to the charging station 70.

Figure 17:
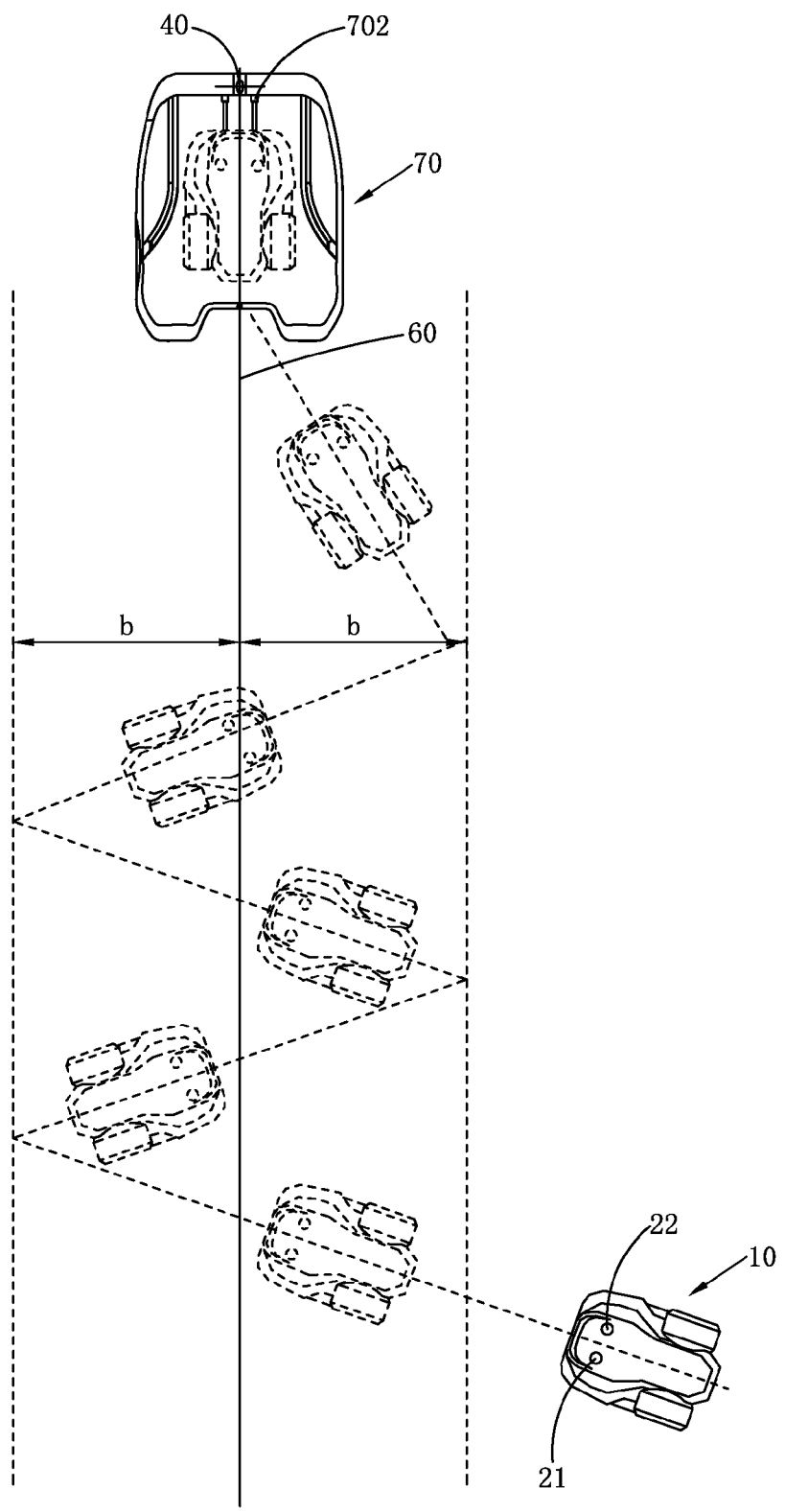
FIG. 17 is a non-line-crossing returning schematic diagram of a self-moving robot of the embodiment as shown in FIG. 15.

In the present embodiment, a returning algorithm in a non line-crossing manner can also be selected to guide the self-moving robot 10 to return to the charging station. A specific returning schematic diagram is as shown in FIG. 17. Steps of a control method after the self-moving robot 10 receives the returning control command are as shown in FIG. 14.

Step S21: the self-moving robot 10 under the returning mode seeks for a signal line 60 randomly or according to a preset track. A first signal detecting device 21 and a second signal detecting device 22 detect an intensity value G1 and an intensity value G2 of the radio signal SS.

Step S22: the control unit 80 judges whether the self-moving robot 10 enters a returning area according to detection results of the first signal detecting device 21 and the second signal detecting device 22.

The detection result of the first signal detecting device 21 is a first result $SS_1'$, and a corresponding intensity value is G1, the detection result of the second signal detecting device 22 is a second result $SS_2'$, and a corresponding intensity value is G2. The control unit 80 presets a second preset threshold $G_s$ related to the signal intensity, by referring to FIG. 9(b), it can be known that the second threshold $G_s$ corresponds to a distance b away from the signal line 60. A preset relationship exists between the size of the second preset threshold $G_s$ and the maximal intensity value $G_{max}$ of the radio signal SS generated by the signal generating device 40, for example $G_s = \alpha G_{max}$, ($\alpha < 1$). Different intensity thresholds $G_s$ represent different distances b to the signal line 60. A user can determine the value of times $G_s$ by using the value b in the actual working condition, and a range of the times is $0.15 \le \alpha \le 0.75$.

If the intensity value G1 of the first result $SS_1'$ and the intensity value G2 of the second result $SS_2'$ are both smaller than $G_s$, then it is indicated that the self-moving robot 10 does not enter the returning area yet. The control unit 80 controls the self-moving robot 10 to continuously perform step S11.

If the intensity value G1 of the first result $SS_1'$ is larger than or equal to $G_s$ and the intensity value G2 of the second result $SS_2'$ is smaller than $G_s$, then it is indicated that the left side of the self-moving robot 10 enters the returning area and the right side does not enter the returning area yet. The control unit 80 controls the self-moving robot 10 to turn left.

If the intensity value G1 of the first result $SS_1'$ is smaller than $G_s$ but the intensity value G2 of the second result $SS_2'$ is larger than or equal to $G_s$, then it is indicated that the right side of the self-moving robot enters the returning area and the left side does not enter the returning area yet. The control unit 80 controls the self-moving robot 10 to turn right.

If the intensity value G1 of the first result $SS_1'$ and the intensity value G2 of the second result $SS_2'$ are both larger than $G_s$, then it is indicated that both the left and right sides of the self-moving robot 10 enter the returning area. The control unit 80 controls the self-moving robot 10 to continuously move along the original direction.

Step S23: the control unit 80 controls the self-moving robot 10 to return to the charging station 70 circuitously under the state as shown in FIG. 17 which takes the signal line 60 as the center by ensuring that the intensity value G1 of the first result $SS_1'$ and the intensity value G2 of the detection result $SS_2'$ are both larger than or equal to $G_s$.

When the self-moving robot 10 is returned according to the steps above, if the signal detecting device 20 suddenly cannot effectively detect the radio signal SS or the signal intensity detected by the signal detecting device 20 is always in a progressive decrease state, then the control unit 80 judges that the self-moving robot 10 advances along a direction in which the signal line 60 gets way from the charging station 70, and the control unit 80 controls a direction of the self-moving robot 10 to be overturned by 180°, and controls the self-moving robot 10 to be continuously returned according to the steps above.

As known by those skilled in the art, the steps and logic judgment conditions in the steps above can be adaptively modified, such that the self-moving robot 10 can return to the charging station 70.

In one embodiment, the signal detecting device 20 is electrically connected to the signal line 60, and the self-moving robot 10 is provided with a signal generating device 40. Positions of the signal generating device 40 and the signal detecting device 20 in the present embodiment are interchanged, only one communication device for transmitting a detection result needs to be matched, no influence is generated on the border algorithm for judging whether the self-moving robot is in the working area and it thus not repeated in detail.

In the radio signal returning guide technology, when the moving robot recognizes a guide signal successfully, whether the current walking direction is correctly over against the charging station cannot be judged, a wrong walking direction of the moving robot in a period of time is caused, and working efficiency of the moving-robot is influenced.

Figure 18:
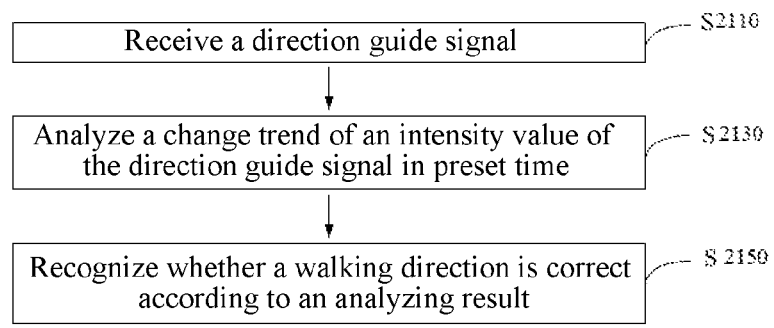
FIG. 18 is a flow schematic diagram of a recognizing method for a walking direction of one embodiment.

A reference is made to FIG. 18 which is a flow schematic diagram of a recognizing method for a walking direction of one embodiment. As shown in FIG. 18, a recognizing method for a walking direction comprises step S2110, receiving a direction guide signal. The direction guide signal is used for guiding an intelligent moving device to walk along a correct direction and can be the radio wave signal emitted by the signal generating device 40 along the signal line 60 in FIGS. 1-17.

Step S2130: analyzing a change trend of an intensity value of the direction guide signal in preset time. If the preset correct walking direction is a direction close to an emitting end of the direction guide signal, when the intelligent moving device moves toward the direction close to the emitting end, an intensity value of the direction guide signal received by the intelligent moving device is gradually increased; otherwise, an intensity value of the direction guide signal received by the intelligent moving device is gradually decreased.

It should be noted that in other embodiments, the preset correct walking direction is not limited thereto. For example, the preset correct walking direction can also be a direction away from the emitting end of the direction guide signal. Thus the correct walking direction can be preset according to actually needs.

Step S2150, recognizing whether the walking direction is correct according to an analyzing result. Specifically, along the preset correct walking direction, the intensity value of the direction guide signal has a specific change trend, which is compared with the analyzing result above, and then whether the walking direction is correct can be recognized.

According to the recognizing method for a walking direction above, the direction guide signal is transmitted to a remote place from an emitting end, and the signal intensity is gradually reduced in a direction away from the emitting end along a transmitting path, otherwise the signal intensity is gradually increased in a direction close to the emitting end along the transmitting path. By analyzing the change trend of the intensity of the received direction guide signal in the preset time and then according to a preset correct walking direction, whether the current walking direction is correct can be judged, such that a device is enabled to timely execute a correct operation according to a judging result, and wrong walking is avoided.

Figure 19:
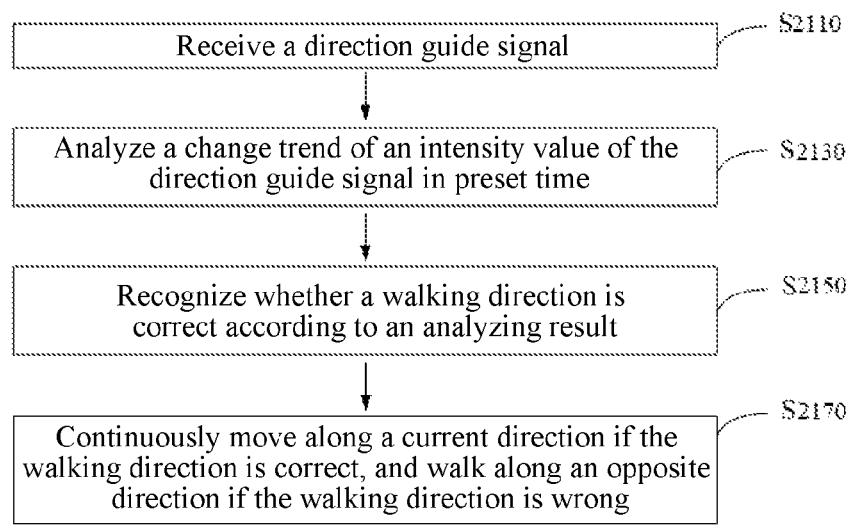
FIG. 19 is a flow schematic diagram of a recognizing method for a walking direction of another embodiment.

Reference is made to FIG. 19 which is a flow schematic diagram of a recognizing method for a walking direction of one embodiment. The method, after the step S2150, further comprises the step:

Step S2170, if the walking direction is correct, then continuously moving along the current direction, and if the walking direction is wrong, walking along an opposite direction, In this way, after the direction guide signal is recognized, whether the walking direction is correct is determined in real time, if the walking direction is wrong, the walking direction is adjusted in time, the problem the wrong working direction cannot be recognized till the tail end of the direction guide signal in opposite walking is avoided, so as to improve working efficiency.

In one of the embodiments, the change trend of the intensity value of the direction guide signal received by the intelligent moving device in preset time is analyzed through the steps as follows: if the analyzed intensity value of the direction guide signal is gradually increased in preset time, then the analyzing result is 1, otherwise, the analyzing result is 0. In this way, the change trend of the intensity value of the direction guide signal in the current walking direction can be obtained quickly, and fastness and convenience are realized.

In one of the embodiments, whether the walking direction is correct is recognized according to the analyzing result by the step as follows: if the analyzing result is that the direction guide signal is gradually increased, then the walking direction is correct, otherwise, the walking direction is wrong. That is, in this step, the preset correct walking direction is the direction in which the intensity value of the direction guide signal is gradually increased. In this way, in the current walking direction, whether the current walking direction is correct can be conveniently and directly judged according to the increase or decrease of the received direction guide signal.

When returned to the charging station, the self-moving robot is returned along a fixed path of a signal line attachment, and returned to the charging station to be charged along the same path in most cases, the self-moving robot grinds the lawn in this path repeatedly to damage the lawn in the path, and the lawn in this path is ground into bare ground under a serious condition. Considering this, it is necessary to provide a path returning method for a self-moving robot to avoid repeated grinding on the same lawn and the damage to the lawn.

Figure 20:
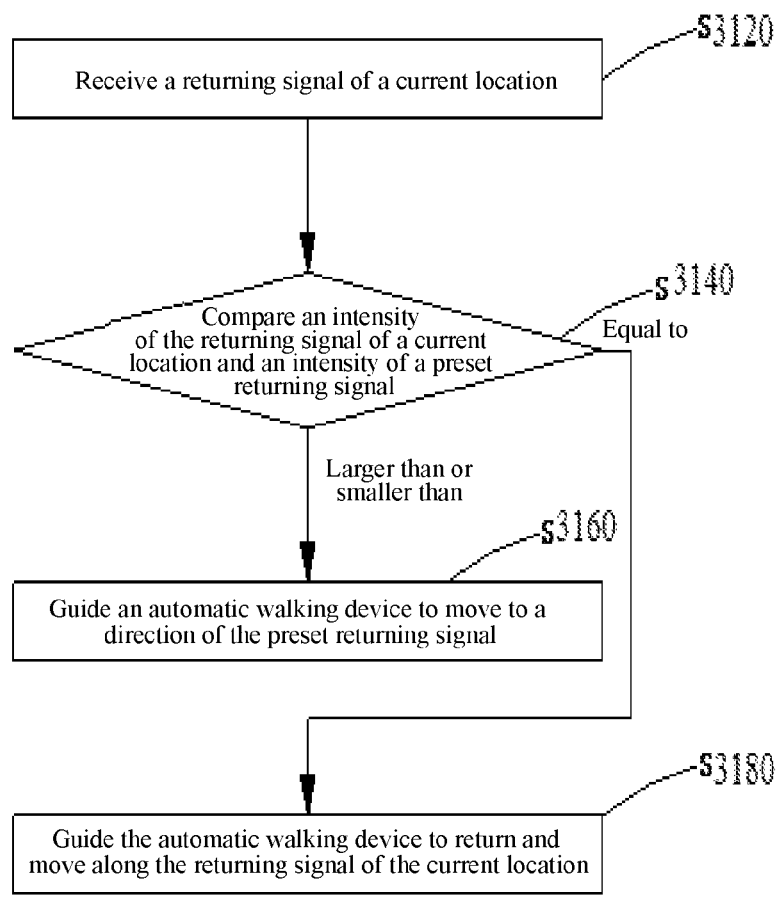
FIG. 20 is a flow chart of a path returning method for a self-moving robot of one embodiment.

As shown in FIG. 20, a path returning method for a self-moving robot according to one embodiment comprises the steps S3120-S3180.

Step S3120: receiving a returning signal of a current location where the self-moving robot is. The returning signal herein is equivalent to the radio wave signal emitted by the signal generating device 40 along the signal line 60 in FIGS. 1-17. When the self-moving device needs to return and needs to return to the charging station for charging, or returned to a parking location in combination work, or returned due to other reasons, the self-moving device needs to returned from the current location, and therefore, the self-moving device can receive the returning signal of the its location per se.

Step S3140: comparing an intensity of the returning signal of the current location with that of a preset returning signal. When the self-moving device is returned, in order to avoid the damage to the lawn caused by repeated grinding due to repeating of the same returning path, the self-moving device needs to return along different returning signals every time, and therefore, a different preset returning signal needs to be set for the returning of the self-moving device every time to prevent repeated grinding and damage to the lawn.

Step S3160: guiding the self-moving robot to move toward a direction of the preset returning signal if the intensity of the returning signal of the current location is larger than or small than that of the preset returning signal. When the returning signal of the current location of the self-moving device is different from the preset returning signal, the self-moving device needs to be guide to move to a location nearby the preset returning signal to prevent the repeated path in returning this time.

Step S3180: guiding the self-moving robot to return and move along the returning signal of the current location if the intensity of the returning signal of the current location is equal to that of the preset returning signal. When the self-moving device moves to the preset returning signal, the self-moving device is returned along the preset returning signal, then repeating of the same returning path can be avoided, and grinding on the lawn is avoided.

In the path returning method for a self-moving walking device, the self-moving robot can return along the returning signal when being returned, and since the self-moving robot is returned along a different returning signal every time, the same lawn path cannot be repeatedly ground, a damage to a lawn is effectively avoided, and the lawn is kept intact.

The step S3160 specifically comprises: guiding the self-moving robot to move toward a direction in which the returning signal is reduced if the intensity of the returning signal of the current location is larger than that of the preset returning signal, otherwise, guiding the self-moving robot to move toward a direction in which the returning signal is increased. The signal of the current location of the self-moving device may be higher than or lower than the preset returning signal, therefore, the self-moving device needs to be guided to a location nearby the preset returning signal, such that the returning signal received by the self-moving device and the preset returning signal are equal or an error of the two is in an allowable range.

The preset returning signal can be a certain intensity value randomly selected when the self-moving device needs to return and can also be a certain intensity value designated by a person, such that it is ensured that the self-moving device is returned along a different path when returned every time.

In the path returning method for a self-moving walking device, the self-moving robot can return along the returning signal when being returned, and since the self-moving robot is returned along a different returning signal every time, the same lawn path cannot be repeatedly ground, a damage to a lawn is effectively avoided, and the lawn is kept intact.

Figure 21:
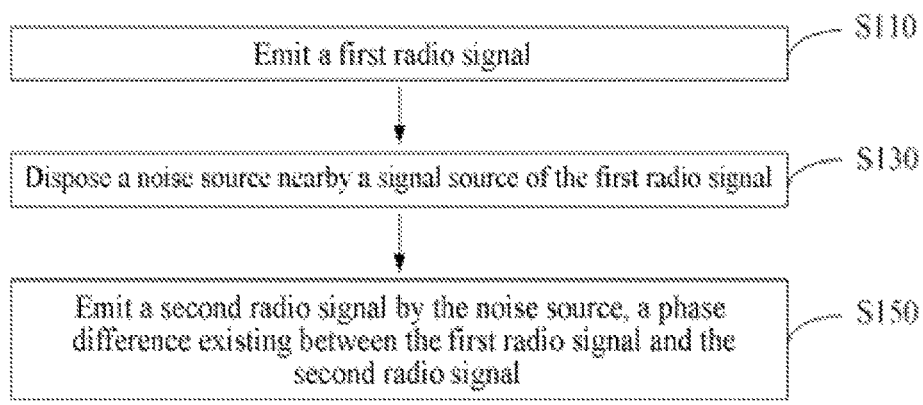
FIG. 21 is a flow schematic diagram of a signal inhibiting method.

Reference is made to FIG. 21, which is a flow schematic diagram of a signal inhibiting method. As shown in the drawing, the signal inhibiting method comprises step S110, emitting a first radio signal, which is transmitted along a specific direction, can serve as a guide signal and is used for guiding the self-moving device to walking along a correct direction.

Step S130, setting a noise source nearby a signal source of the first radio signal. The signal source is used for reducing a signal noise ratio of a signal source end.

Step S150, emitting a second radio signal by a noise source. The first radio signal and second radio signal have different frequencies, or a phase difference exists between the first radio signal and the second radio signal, and the second radio signal is used for inhibiting the first radio signal and can interfere the first radio signal, particularly interfere the first radio signal nearby the signal source, so as to reduce the signal noise ratio of the signal source end.

According to the signal inhibiting method above, the noise source is increased nearby the signal source, and the signal noise ratio of the signal source end is reduced. Since the second radio signal emitted by the noise source and the first radio signal have different frequencies or a phase difference exists between the second radio signal and the first radio signal, the first radio signal outward emitted by the signal source end is interfered by the second radio signal. Therefore, the second radio signal effectively inhibits a signal intensity and coverage of the first radio signal nearby the signal source end, with the same signal power, in a location nearby the signal source end, the intensity of the first radio signal is reduced, the coverage is reduced, an emitting distance is unchanged and the first radio signal converged to the signal intensity center.

In one of the embodiments, directions of the first radio signal and the second radio signal are kept consistent. In this way, along an emitting direction of the first radio signal, the second radio signal can inhibit signal intensity and radiation range of the first radio signal, such that the first radio signal is regularly inhibited in a transmission direction.

In one of the embodiments, a relationship between the intensity of the second radio signal and the distance of the noise source is consistent with that between the intensity of the second radio signal and the distance of the signal source. Since the noise source is close to the signal source, the second radio signal can uniformly inhibit the first radio signal. The signal intensity of the inhibited first radio signal in each location of the transmission direction is more balanced. Similarly, the radiation range of the first radio signal in each location of the transmission direction is more uniformly inhibited.

Figure 1:
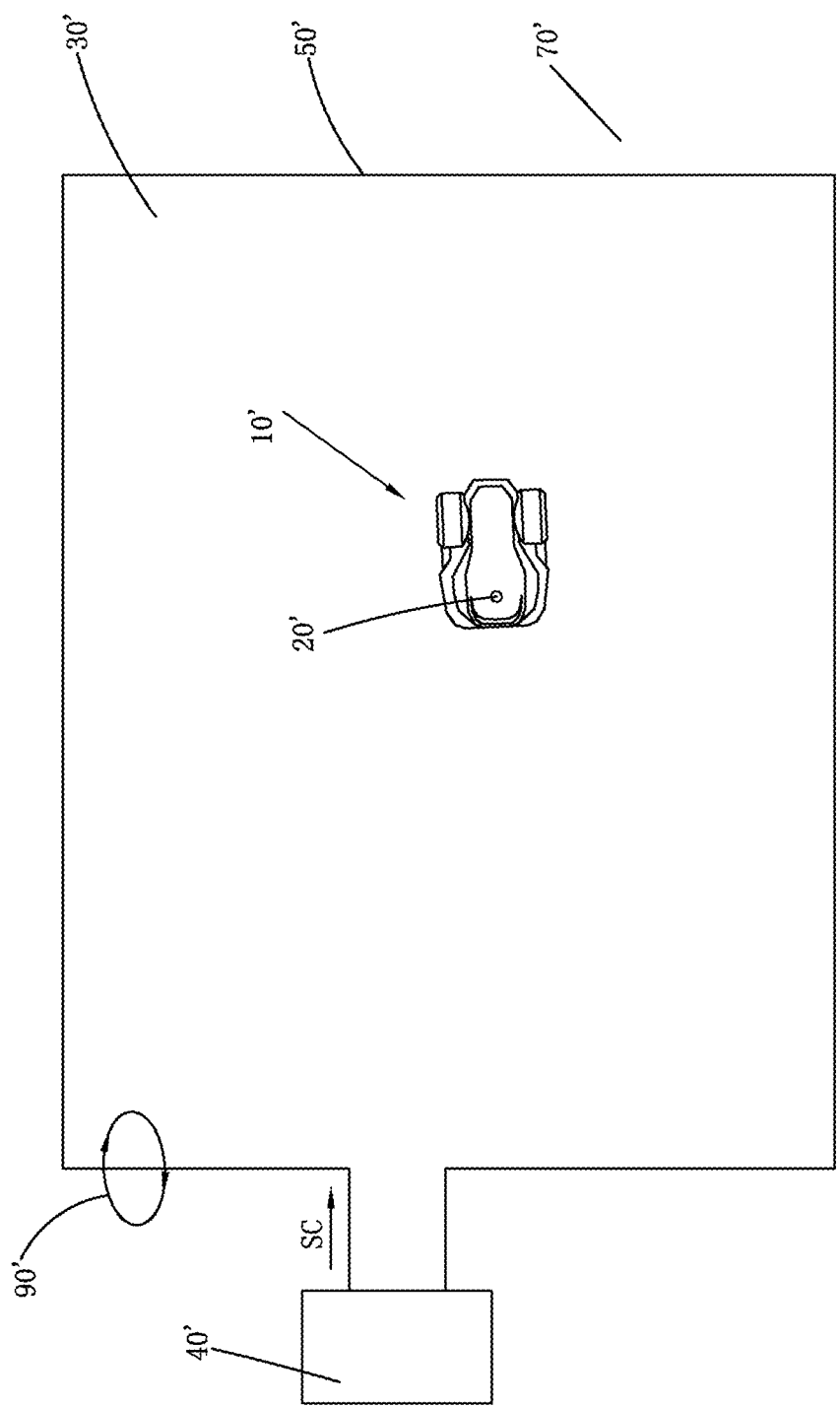
FIG. 1 is a system schematic diagram of a self-moving robot under a working mode of prior art.
Figure 2:
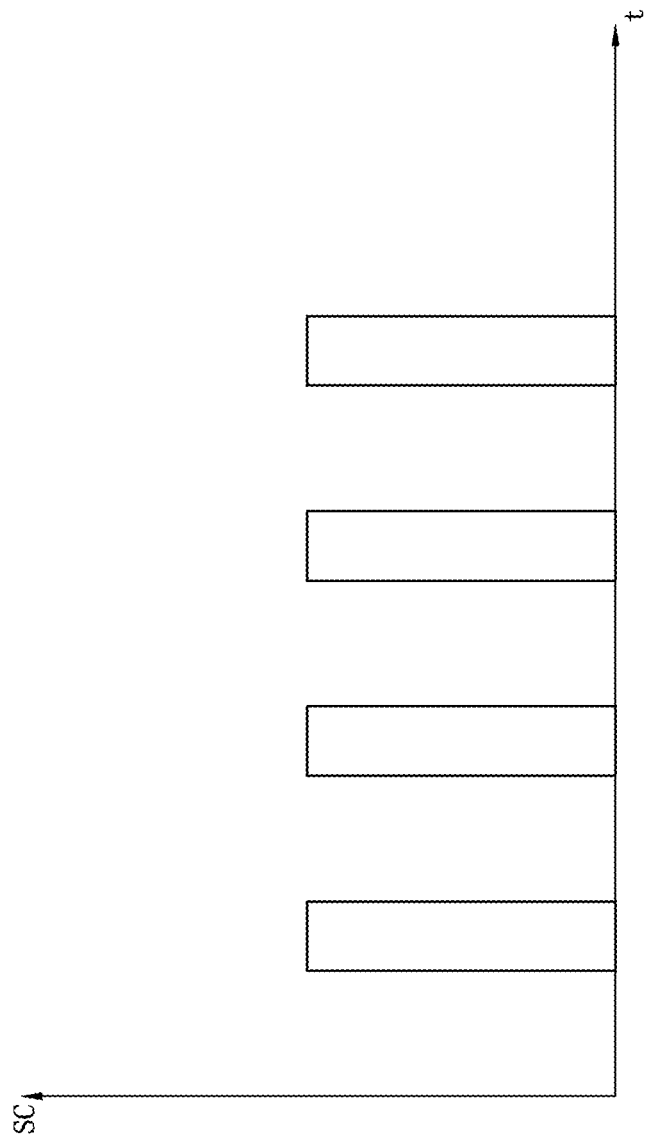
FIG. 2 is a schematic diagram of a preset border signal of the prior art.
Figure 22:
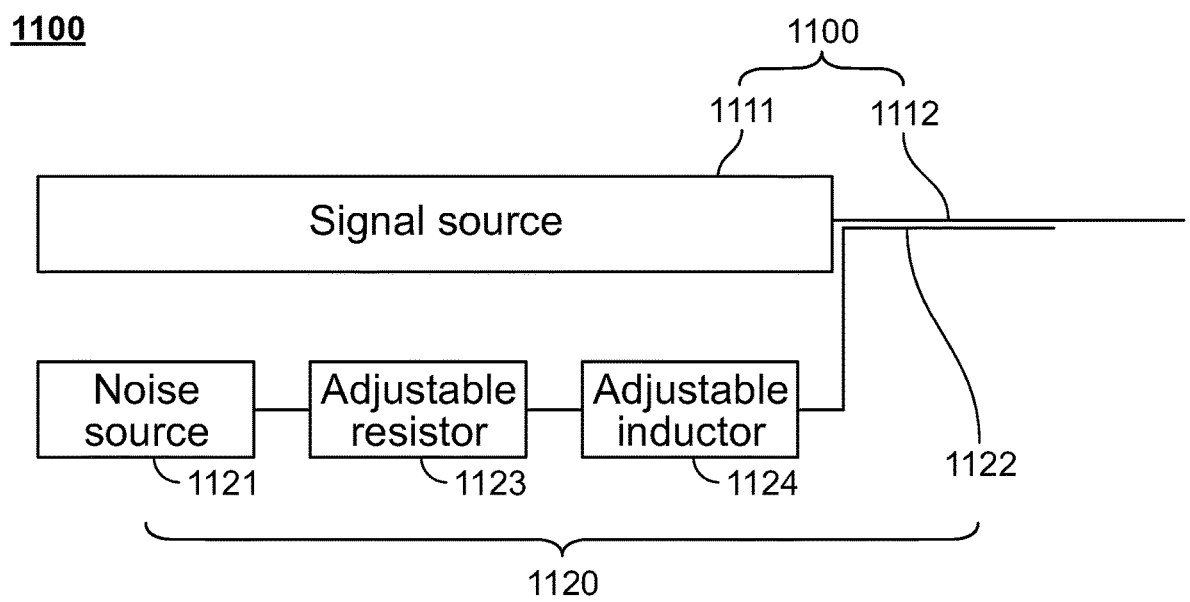
FIG. 22 is a structural schematic diagram of a signal generating device of one embodiment.

Reference is made to FIG. 22, which is a structural schematic diagram of a signal generating device according to one embodiment. As shown in FIG. 2, a signal device 1100 is configured to emit a guide signal guiding the intelligent moving device to walk and comprises a signal emitting unit 1110 and a signal inhibiting unit 1120, wherein the signal emitting unit 1110 includes a signal source 1111 and an emitting antenna 1112, one end of the emitting antenna 1112 is connected to the signal source 1111, the other end unidirectionally extends and the emitting antenna 1112 does not constitute a circuitry loop. The signal source 1111 in the present embodiment is equivalent to the signal generating device 40 in the embodiments of FIGS. 1-17, and the emitting antenna 1112 is equivalent to the signal line 60 in the embodiments of FIGS. 1-17. The signal source 1111 emits a first radio signal through the emitting antenna 1112. The first radio signal covers a specific range, and has a signal intensity center in its transmission direction, the first radio signal serves as a guide signal of the intelligent moving device, and the intelligent moving device can walk to a preset location along the center of the signal intensity. The signal inhibiting unit 1121 includes a noise source 1121, the noise source 1121 is disposed nearby the signal source 1111 and is configured to reduce a signal noise ratio of the end of the signal source 1111 and emit a second radio signal, the second radio signal and the first radio signal have different frequencies or a phase difference exists between the second radio signal and the first radio signal, and the second radio signal is configured to inhibit the first radio signal. The noise source 1121 and the signal source 1111 are different, and the second radio signal emitted by the noise source 1121 can interfere with the first radio signal emitted by the signal source 1111, so as to reduce the signal noise ratio of the end of the signal source 1111.

According to the signal device 1100, the noise source 1121 is increased nearby the signal source 1111, and the signal noise ratio of the signal source end 1111 at the signal source end is reduced. Meanwhile, since the second radio signal emitted by the noise source 1121 and the first radio signal have different frequencies or a phase difference exists between the second radio signal and the first radio signal, the first radio signal outward emitted by the signal source 1111 is interfered by the second radio signal. Therefore, nearby the signal source end, the second radio signal effectively inhibits a signal intensity and coverage of the first radio signal, with the same power of the signal source 1111, in a location nearby the signal source end, the intensity of the first radio signal is reduced, the coverage is reduced, an emitting distance is unchanged and the first radio signal is converged to the signal intensity center.

In the present embodiment, power of the signal source 1111 is larger than that of the noise source 1121. Thus the first radio signal is prevented from being excessively inhibited by the second radio signal, such that the intelligent moving device can recognize the first radio signal, and walk to the preset location along the center of the signal intensity of the first radio signal.

In the present embodiment, Directions of the first radio signal and the second radio signal are kept consistent. In this way, along an emitting direction of the first radio signal, the second radio signal can inhibit signal intensity and radiation range of the first radio signal, such that the first radio signal is regularly inhibited in a transmission direction. The first radio signal can be a signal having directivity, and correspondingly, the second radio signal can be a signal having directivity. Thus, the first radio signal can serve as a precise signal required by other devices.

As shown in FIG. 22, the emitting antenna 1112 is a non-closed antenna, one end of the emitting antenna 1112 connected to the signal source 1111 is a start point, the other end of the emitting antenna 1112 is a free end, i.e., a tail end. Thus, the first radio signal is radiated to a free space along the emitting antenna 1112. When the distances from the signal source 1111 are equal, the closer to the antenna is, the larger the signal noise ratio is, and more dispersed the first radio signal is. In the present embodiment, the emitting antenna 1112 is linear. Thus, the first radio signal can be transmitted along a specific direction. Specifically, the emitting antenna 1112 is a linear section having a preset length, thus, the length of the emitting antenna 1112 can be set according to needs, resources are reasonably used and cost is reasonably controlled.

The signal inhibiting unit 1120 also comprises an inhibiting line 1122, one end of the inhibiting line 1122 is connected to the noise source 1121, the other end unidirectionally extends, and the inhibiting line 1122 does not constitute a circuitry loop. The noise source 1121 emits the second radio signal through the inhibiting line 1122; the inhibiting line 1122 and the emitting antenna 1112 are adjacently disposed, an extending direction of the inhibiting line 1122 and that of the emitting antenna 1112 are consistent, and the tail end of the inhibiting line 1122 is closer to the signal source 1111 than the tail end of the emitting antenna 1112. The inhibiting antenna 1122 is a non-closed antenna, one end of the inhibiting line 1122 connected to the noise source 1121 is a start point, the other end of the inhibiting antenna 1122 is a free end, i.e., a tail end. Thus, the second radio signal is radiated to a free space along the inhibiting antenna 1122. The inhibiting antenna 1122 is linear. Thus, the second radio signal can be transmitted along a specific direction. The inhibiting line 1122 and the emitting antenna 1112 are adjacently disposed and have the consistent extending directions, such that transmission directions of the second radio signal and the first radio signal are kept consistent. In the present embodiment, the inhibiting line 1122 and the emitting antenna 1112 are parallel and are disposed as close as possible, thus, the second radio signal can more effectively inhibit the first radio signal. The tail end of the inhibiting line 1122 is closer to the signal source 1111 than the tail end of the emitting antenna 1112, and the inhibiting line 1122 is close to the signal source 1111, such that the second radio signal mainly inhibits the first radio signal nearby the signal source 1111, and the first radio signal nearby the signal source 1111 is converged to the center of the signal intensity. In the present embodiment, since being both linear, the inhibiting line 1122 and the emitting antenna 1112 are parallel and disposed as close as possible, meanwhile, since the noise source 1121 is also disposed as close to the signal source 1111 as possible, a length of the inhibiting line 1122 is smaller than that of the emitting antenna 1112. Specifically, the inhibiting line 1122 has adjustable length and is configured to adjust an emitting range of the second radio signal, the longer the inhibiting line 1122 is, the better the inhibiting effect of the second radio signal on the first radio signal is, thus, the length of the inhibiting line 1122 can be adjusted according to a required inhibiting effect. Of course, relative positions of the inhibiting line 1122 and the emitting antenna 1112 can also be set according to actual needs, but not limited thereto.

The signal inhibiting unit 1120 also comprises an adjustable resistor 1123 and/or adjustable inductor 1124, and the adjustable resistor 1123 and/or adjustable inductor 1124 are/is serially connected between the noise source 1121 and the inhibiting line 1122. Power of the noise source 1121 can be adjusted by adjusting the size of the adjustable resistor 1123 and/or adjustable inductor 1124, and further the signal intensity and radiation range of the second radio signal can be adjusted. Thus, a user can flexibly control the signal intensity and radiation range of the second radio signal by adjusting the size of the adjustable resistor 1123 and/or adjustable inductor 1124 according to a degree that the first radio needs to be inhibited, and the first radio signal can be effectively inhibited. In the present embodiment, the signal inhibiting unit 1120 can comprise both the adjustable resistor 1123 and adjustable inductor 1124, when the value/s of the adjustable resistor 1123 and/or adjustable inductor 1124 are/is increased, power of the noise source 1121 is increased, the signal intensity of the second radio signal is increased, the radiation range is increased, and the inhibited effect of the first radio signal is enhanced. When the value/s of the adjustable resistor 1123 and/or adjustable inductor 1124 are/is decreased, power of the noise source 1121 is decreased, the signal intensity of the second radio signal is decreased, the radiation range is decreased, and the inhibited effect of the first radio signal is weakened. In actual application, the user can adjust the power of the noise source according to needs.

In one of the embodiments, a relationship between the intensity of the second radio signal and the distance of the noise source 1121 is consistent to a relationship between the intensity of the first radio signal and the distance of the signal source 1111. Since the noise source is close to the signal source, and meanwhile, directions of the first radio signal and the second radio signal are kept consistent, the second radio signal can uniformly inhibit the first radio signal. The signal intensity of the inhibited first radio signal in each location of the transmission direction is nearly equal. Similarly, the radiation range of the first radio signal in each location of the transmission direction is more inhibited.

In one of the embodiments, the signal emitting unit also comprises an inverter, an input end of the inverter is connected to an emitting end of the signal source, and an output end of the inverter serves as an emitting end of the noise source. An emitting end of the signal source is connected to the inverter, a signal output by the output end of the inverter and the first radio signal are same in frequency and different in phase, that is, the two has a phase difference. Thus, the noise source with the same frequency and different phase can be obtained by using the signal source, and device resources are saved and application is convenient.

Figure 3:
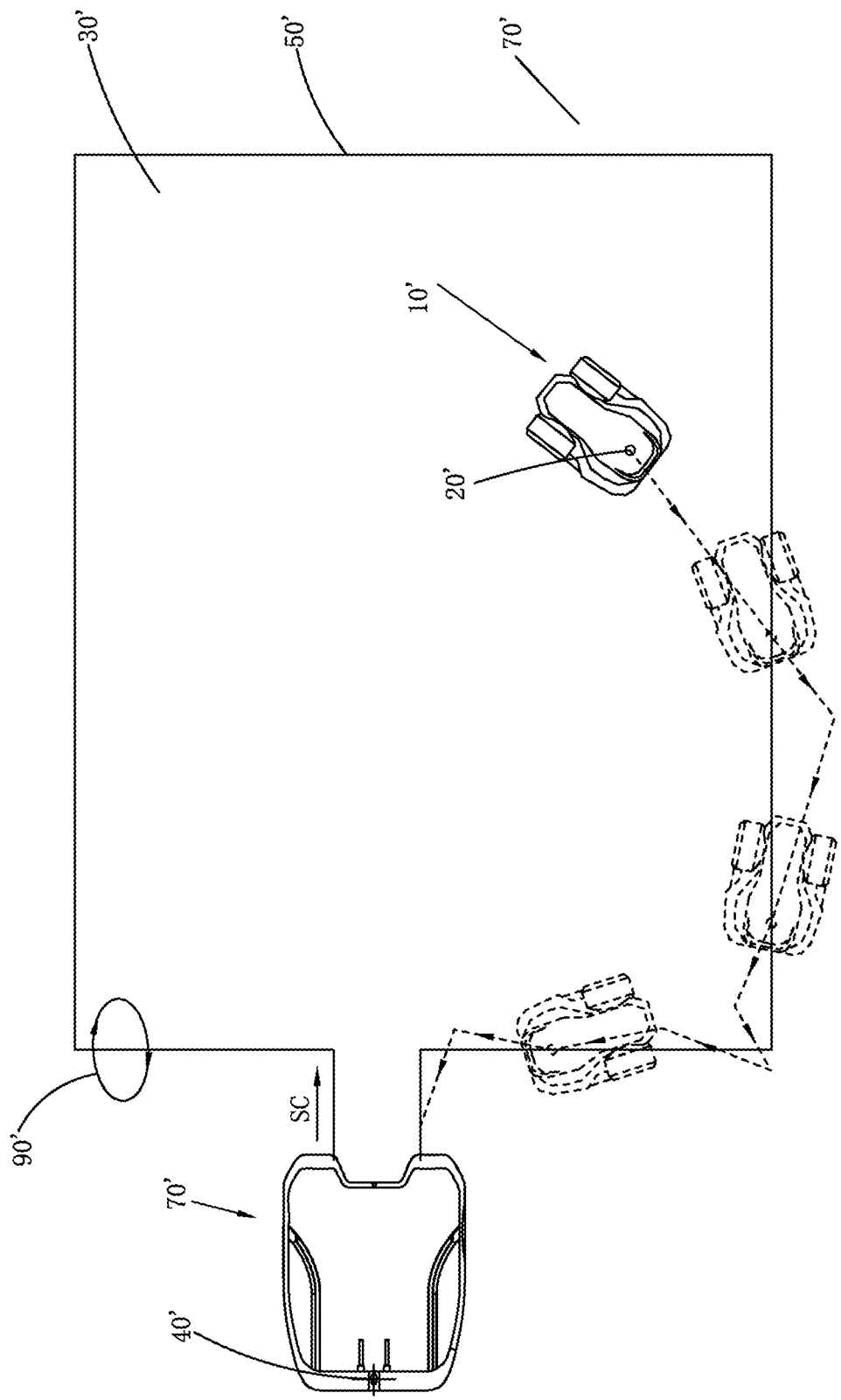
FIG. 3 is a schematic diagram of a non-line-crossing returning system of the self-moving robot under a returning mode of the prior art.
Figure 4:
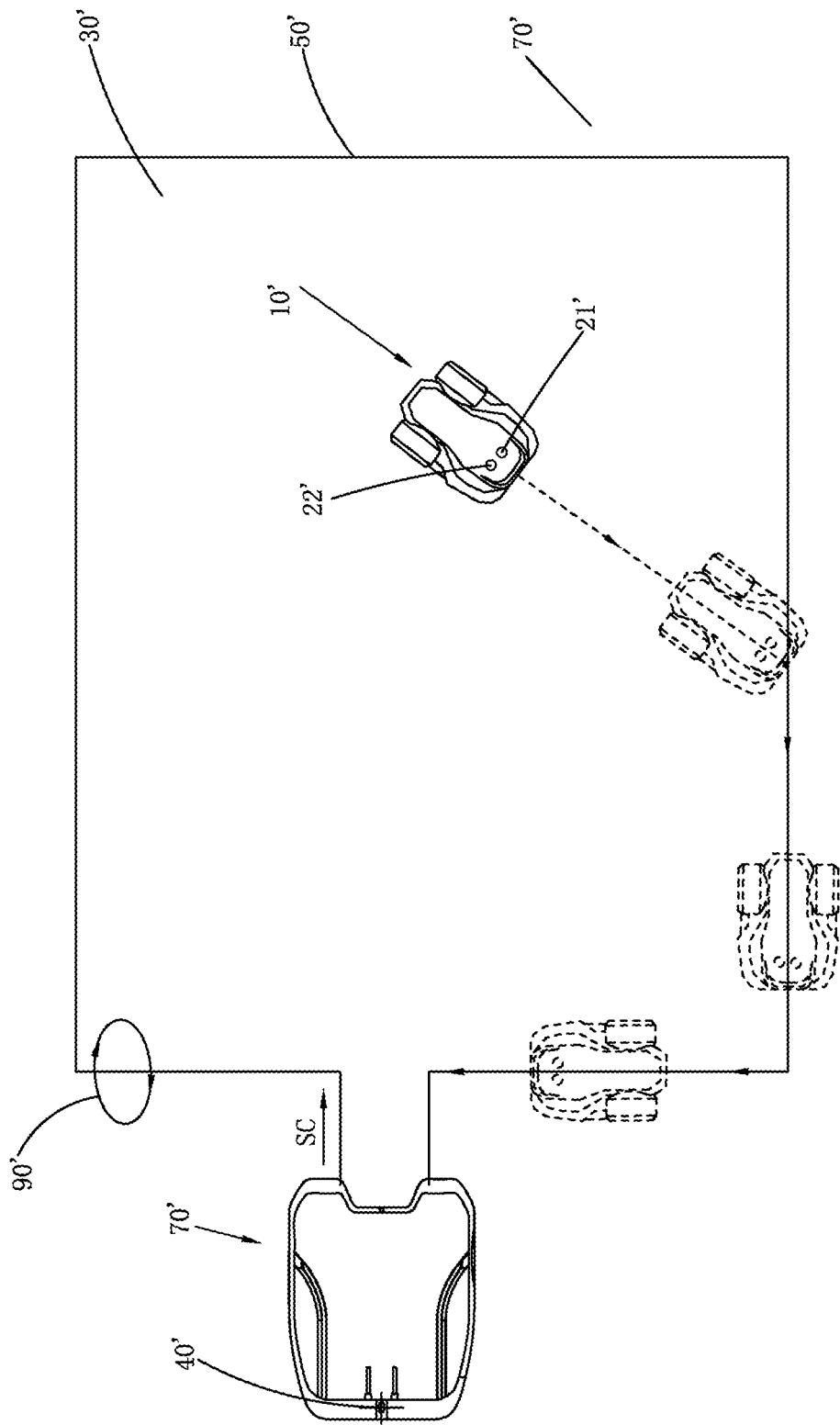
FIG. 4 is a schematic diagram of a line-crossing returning system of the self-moving robot under a returning mode of the prior art.
Figure 23:
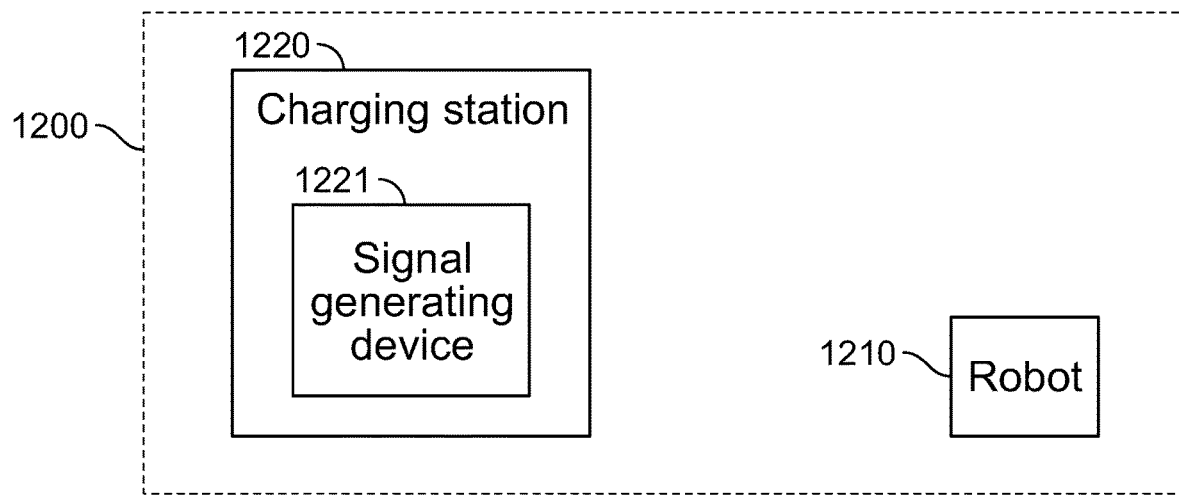
FIG. 23 is a schematic diagram of a robot system of one embodiment.

Reference is made to FIG. 23, which is a schematic diagram of a robot system according to one embodiment. As shown in FIG. 3, a robot system 1200 comprises a robot 1210 and a charging station 1220. In the present embodiment, the robot system is equivalent to the self-moving robot system in the embodiments of FIGS. 1-17, the robot 1210 is equivalent to the self-moving robot 10 in the embodiments of FIGS. 1-17, and the charging station 1220 is equivalent to the charging station 70 in the embodiments of FIGS. 1-17. The robot 1210 is configured to execute corresponding walking and working in a specific working area. The charging station 1220 is configured to provide electricity for and/or park the robot 1210. The robot system 1200 also comprises a signal device 1100, which is the signal device in any one of the embodiments above and is configured to emit a guide signal guiding the robot 1210 to walk. The signal device 1100 sends a first radio signal, which serves as a guide signal and is configured to guide the robot 1210 to walk along a correct direction. The signal device 1100 is disposed in the charging station 1220, and can enable the robot 1210 to return to the charging station 1220 along the center of the signal intensity of the first radio signal. The signal device 1100 also emits a second radio signal, and the second radio signal can effectively inhibit the first radio signal at the signal source end of the first radio signal, and returning accuracy of the robot 1210 can be improved.

According to the robot system 200 above, since the signal device 1100 is disposed, in the signal device 1100, a signal noise ratio of the first radio signal at the signal source end is reduced, and the signal intensity and radiation range of the first radio signal are effectively inhibited by interference of the second radio signal. In one aspect, nearby the signal source end, with the same signal source power, the signal intensity of the first radio signal is reduced, and an emitting distance is not changed, such that the robot 1210 can more easily find the center of the signal intensity in a preset signal intensity threshold range; and in the other aspect, the first radio signal is converged to the center of the signal intensity, such that the radiation range of the first radio signal is reduced, and therefore, the robot 1210 can be more precisely returned to the charging station 1220 along the center of the signal intensity.

Figure 24:
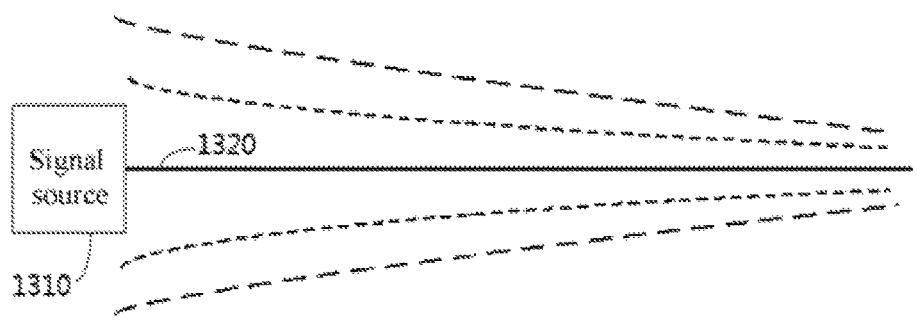
FIG. 24 is a signal schematic diagram when a first radio signal nearby a signal source end is not inhibited.
Figure 25:
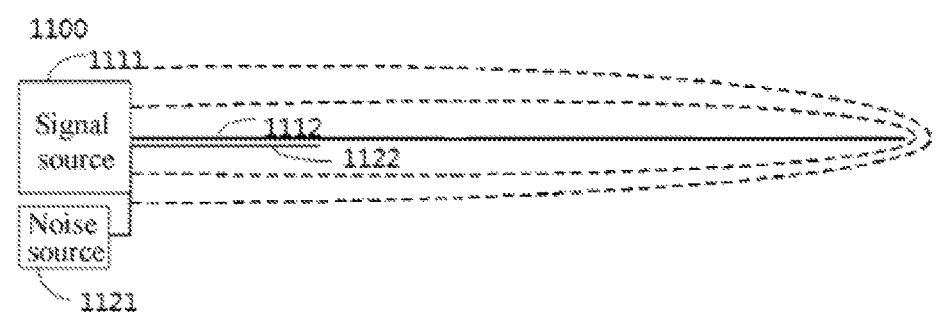
FIG. 25 is a signal schematic diagram of a first radio signal of the signal generating device of an embodiment as shown in FIG. 22 nearby a signal source end.

FIGS. 24 and 25 are respectively a signal schematic diagram of the first radio signal that no noise source is set nearby a signal source end, and a signal schematic diagram of the first radio signal of the signal generating device of the embodiment as shown in FIG. 22. As shown in FIG. 24, the virtual line is an equipotential distribution schematic diagram of intensity of the first radio signal, the signal source 1110 emits the first radio signal along the emitting antenna 1120, the emitting antenna 1120 is a linear section, the signal intensity center of the first radio signal is located on the emitting antenna 1120, and the signal intensity and radiation range of the signal intensity center are gradually reduced along the direction of the emitting antenna 1120 from the signal source 1110. However, the first radio nearby the signal source 1110 is a dispersed signal, the signal intensity is very strong and the radiation range is larger.

Reference is made to FIG. 25, the virtual line is an equipotential distribution schematic diagram of intensity of the first radio signal, in combination with FIG. 22, the noise source 1121 is disposed nearby the signal source 1111 and emits a second radio signal (not shown) along the inhibiting line 1122, and the inhibiting line 1122 is clung to the emitting antenna 1112, and extends in a direction same as that of the emitting antenna 1112. The second radio signal plays a role of inhibiting the first radio signal.

By comparing FIG. 24 and FIG. 25, it can be obviously saw that after the noise source is disposed nearby the signal source end, the first radio signal along the emitting antenna 1112 nearby the signal source end is a signal converged to the emitting antenna 1112. The signal intensity of the inhibited first radio signal along each location of the emitting antenna 1112 is nearly equal. The radiation range of the first radio signal along the each location of the emitting antenna 1112 is also inhibited. Particularly, the signal intensity and radiation range of the signal intensity center in the position of the emitting antenna 1112 close to the signal source 1111 are converged to the signal intensity center, and a coverage is narrowed, such that the robot 1210 can more easily find the signal intensity center in a preset signal intensity threshold range, and can be more precisely returned to the charging station 1220 along the signal intensity center. For example, the first radio signal as shown in FIG. 24 is nearby one reference point on the emitting antenna 1120 close to the signal source 1110, assuming that a relative value of the signal intensity on this reference point is 100, then the signal with a signal intensity relative value being 80 is located in a position away from the reference point by a vertical distance of 1 m. While the first radio signal of the signal source 1111 inhibited by the noise source 1121 as shown in FIG. 25 is nearby the same reference point on the emitting antenna 1112 close to the signal source 1111, a relative value of the signal intensity on the reference point is 100, then the signal with a signal intensity relative value being 80 is located in a position away from the reference point by a vertical distance of 15 cm, that is, the signal intensity and radiation range of the first radio signal are converged to the emitting antenna 1112 (i.e., the signal intensity center).

It is noted that in order to facilitate comparing, the relative value of the signal intensity is obtained by normalizing an actual value of the signal intensity, and is not limited thereto in other embodiments.

Therefore, such robot system can enable the robot 1210 to be more precisely returned to the charging station 1220 along the signal intensity center.

Figure 26:
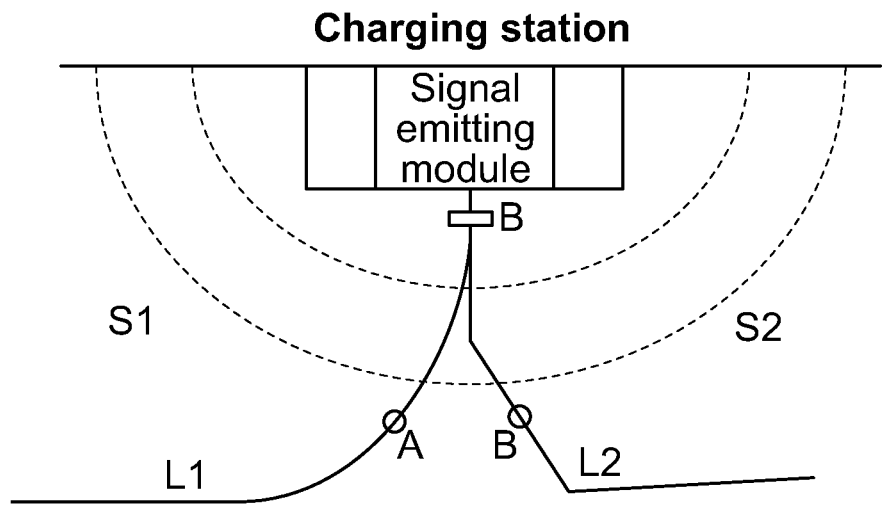
FIG. 26 is a schematic diagram of an intelligent working system of one embodiment.

As shown in FIG. 26, an intelligent working system of one embodiment comprises an automatic walking device, a charging station, a signal emitting module disposed in the charging station and a guide line connected to the signal emitting module; the charging station is configured to provide electricity for or/and park the automatic walking device; at least one guide line is disposed and is configured to divide a working area of the automatic walking device into a plurality of small working areas and guide the automatic walking device to move by radiating a signal to the space; the signal emitting module is configured to selectively electrically switch on the connection with the guide line to transmit a signal to the guide line, and radiate the signal to the space through the guide line, wherein the automatic walking device comprises a signal receiving module, configured to receive the signal radiated to the space by the guide line; a signal recognizing module, configured to recognize a corresponding guide line according to the signal received by the signal receiving module; and a moving module, configured to control the automatic walking device to move to the small working areas divided by the guide line along the guide line recognized by the signal recognizing module to execute a working task.

In the intelligent working system above, when in work, the automatic walking device can select a corresponding small working area for operation in different small working areas and the operation is operated.

In the present embodiment, the intelligent mower serves as one of the automatic walking devices, when in work every time, the intelligent mower is controlled to select a different small working area in a balanced manner for mowing operation, such that all areas in a lawn can be trimmed consistently, and the lawn is more attractive.

When the automatic walking device needs to return, in order to prevent the automatic walking device from being returned along the same path every time and from grinding the lawn, when the automatic walking device finishes operation in the small working area, the automatic walking device can return along the corresponding guide line, and the lawn is prevented from being ground repeatedly. Therefore, the automatic walking device also comprises a seeking module, configured to seek for a corresponding guide line of the automatic walking device in the small working area when the automatic walking device is required to return; and a returning module, configured to guide the automatic walking device to return to the charging station along the guide line sought by the seeking module.

In the present embodiment, the signal emitting module is equivalent to the signal generating device 40 in the embodiments of FIGS. 1-17, and the guide line is equivalent to the signal line 60 in the embodiments of FIGS. 1-17.

In the present embodiment, the guide line can be a one-way line and does not constitute a closed loop, and the shape of the guide line can be in a linear or bent type. By taking the intelligent mower as an example, as shown in FIG. 26, the charging station is provided with the signal emitting module connected to guide lines L1 and L2, and the intelligent mower E can move along the guide line L1 or L2. When the guide lines L1 and L2 are arranged, non-mowing areas (places such as a pond and pit where mowing cannot be performed) can be divided, for example, in FIG. 1, the guide lines L1 and L2 divide the mowing area into a small working area S1 and a small working area S2, and the place between the small working area S1 and the small working area S2 is a non-mowing area. A plurality rather than two of guide lines can be disposed, and the present embodiment only presents one implementable manner and is not limited thereto.

Figure 27:
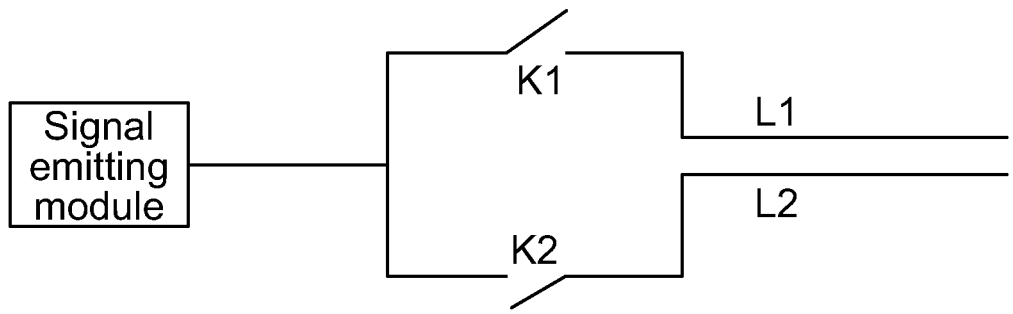
FIG. 27 is a connecting schematic diagram of a signal emitting module and a guide line in FIG. 26.

When the intelligent mower E selects the mowing area, the signal emitting module needs to selectively switch on the connection with the guide line. In order to ensure that the whole lawn is trimmed consistently by the intelligent mower E, the signal emitting module can selectively switch on the guide line according to a certain design rule, for example, the guide lines are sequentially switched on in order, and a switching on manner is randomly selected. When the present embodiment is implemented, a control switch is connected between the signal emitting module and the guide line, and the signal emitting module selectively electrically switches on the connection with the corresponding guide line by closing the control switch and disconnects the connection with the guide line by turning off the control switch. As shown in FIG. 27, A control switch K1 is disposed between the signal emitting module and the guide line L1, a control switch K2 is disposed between the signal emitting module and the guide line L2, and the signal emitting module can switch on the connection with L1 or L2 by closing K1 or K2, so that the intelligent mower is selected to work in the small working area S2 or mall working area S2.

In combination with what are shown in FIGS. 26 and 27, by taking an intelligent mower as an example, when the mowing operation is executed, the signal emitting module can adopt a manner of switching on the guide line L1 and the guide line L2 in sequence, during mowing for the first time, the signal emitting module can switch on the guide L1 at first, after the signal receiving module of the intelligent mower E receives a signal, the signal recognizing module will recognize the guide line L1, and the moving module will control the intelligent mower to move to the small working area S1 along the guide line L1 for working. But when the intelligent mower moves along the guide line L1, the most suitable start point needs to be selected for starting working, also a same working effect needs to be ensured in the small working area S1 and the small working area S2, and then a vegetation condition in a whole lawn can be enabled to be consistent and more attractive. Therefore, the guide line is provided with a start point for regulating the automatic walking device to start working and the moving module starts to execute a task by controlling the automatic walking device to move to the start point on the guide line. As shown in FIG. 1, the guide line L1 is provided with a start point A, and the guide line L2 is provided with a start point B. When moving to A or B, the automatic mower E can start off from the start point A or B for working. In order to determine that the intelligent mower moves to the start point, in the present embodiment, the moving module can control the automatic walking device to move for preset time T1 so as to move the automatic walking device to the start point on the guide line to start executing a task, wherein the moving module needs to control the automatic walking device to move at a constant speed. In order to ensure that the whole lawn is trimmed consistently, in the present embodiment, the automatic walking device also comprises a time setting module and a starting module. The time setting module is configured to set working time T2 of the automatic walking device in the small working area when the moving module controls the automatic walking device to move to the small working area divided by the guide line to start to execute the working task. The starting module is configured to start a returning mode when the working time of the automatic walking device in the small working time reaches T2, wherein when the starting module starts the returning mode, the seeking module seeks for a guide line corresponding to the small working area where the automatic walking device is. For example, when the intelligent mower works in the small working area S1, the time setting module will set the working setting time T2 in the small working area S1, wherein the time T2 can be set according to conditions such as the area of the small working area S1 and a trimming degree. When time that the intelligent mower works in the small working area S1 reaches T2, the starting module automatically starts a returning mode, at this point, when confirming that the returning mode is started, the seeking module will automatically seek for the guide line L1 corresponding to the intelligent mower in the small working area S1, and the moving module will control the intelligent mower to return to the charging station along the guide line L1. Afterwards, the signal emitting module will select to close the connection between the control switch K2 and the guide line L2, and working is carried out in the small working area S2 till the whole working task is finished. Therefore, the present embodiment can ensure that the whole lawn is trimmed consistently.

A path moving system comprises a mower and a base station and also comprises a first radio signal communication module disposed on the base station and a second radio signal communication module disposed on the mower, wherein the first radio signal emitting module and the second radio signal receiving module transmit a radio signal with each other; a signal emitter disposed on the base station, configured to emit a guide signal; N guide lines connected to the signal emitter, wherein the N guide lines divide the lawn into N+1 mowing areas, and are configured to transmit the guide signal; and a guide signal receiving module disposed on the mower and configured to receive the guide signal, wherein the mower is returned to the base station or arrives at a designated mowing area from the base station for mowing according to the radio signal and the guide signal.

In the path moving system above, the mower can return to the base station along the guide line, and can also move to the corresponding mowing area along the guide line, and the mower can mow in all mowing areas to improve mowing efficiency.

With N guide lines disposed, the mower can return to the base station along the guide line, and returning efficiency is improved. The N guide lines divide the mowing area into N+1 mowing areas, when the mower receives a mowing command toward a certain mowing area, the mower can directly move to the corresponding mowing area along the guide line, locating mowing is realized, and mowing efficiency is improved.

Two guide lines Line 1 and Line 2 are shown in FIG. 26, and the two guide lines divide the lawn into a G area, a D area and areas between the G area and the D area. Division of the lawn by more guide lines is similar to that in FIG. 1, and is not specifically explained in the present embodiment.

The lawn can be divided into corresponding mowing areas by the guide lines, the mower can enter a corresponding mowing area according to a mowing command so as to conveniently mow the grass, the mower is prevented from blind mowing, and mowing efficiency is improved. In the present embodiment, the mower arrives at a designated mowing area from the base station for mowing according to the radio signal and the guide signal, specifically, When the control module of the mower receives a mowing command of moving to one of the mowing areas, a radio signal is sent to the first radio signal communication module through the second radio signal communication module, the radio signal comprises a mowing command, the base station switches on the connection between the corresponding guide line and the signal emitter according to the mowing command, and the guide signal receiving module receives the guide signal to enable the mower to move to the corresponding mowing area along the guide line.

In the present embodiment, the radio signal is a Bluetooth signal, an ultrasonic wave signal or WIFI signal, and obviously, the radio signal is gradually decreased along the increase of an emitting distance.

In the present embodiment, the mower can return to the base station except for entering the designated mowing area according to the mowing command. For example, when the mower mows in the mowing area, the mower needs to return under the conditions of bad weather or due to other reasons. In the present embodiment, the mower is returned to the base station according to the radio signal and the guide signal, specifically, when detecting that the mower is required to returned to the base station, the control module of the mower sends a radio signal to the first radio signal communication module by the second radio signal communication module, the radio signal comprises a returning command, the base station switches on the connection between the corresponding guide line and the signal emitter according to the returning command, and the guide signal receiving module receives the guide signal such that the mower is returned to the base station along the guide line.

In the present embodiment, when the mower repeatedly enters certain mowing area for mowing, if the mower is returned along the same guide line repeatedly, as a result of the repeated grinding on the lawn, the lawn nearby the guide line will be damaged. Therefore, the mower is prevented from being returned to the base station along the same path repeatedly. In the present embodiment, when the guide signal receiving module receives the guide signal to enable the mower to return along the guide line, the control module can control the mower to guide the mower to walk along the left, right or middle of the guide line, such that the manner of walking along the guide line is different from that along the guide line when the mower is returned last time, and grinding on the lawn is effectively avoided.

In the present embodiment, when the guide signal receiving module receives the guide signal such that the mower is returned along the guide line, if the control module of the mower detects an obstacle, the control module controls the mower to walk along the left, right or middle of the guide line to avoid the obstacle.

In the present embodiment, when detecting that the mower cannot avoid the obstacle by walking along the left, right or middle of the guide line to avoid the obstacle, the control module sends a radio signal to the first radio signal communication module by the second radio signal communication module, the radio signal comprises a switching command, the base station disconnects the connection between the current guide line and the signal emitter according to the switching command, and switches on the connection between another guide line and the signal emitter to move the mower to the base station.

In the present embodiment, a switch or an electronic device, such as or a relay, is disposed between the signal emitter and each of the N guide lines. The base station can control the closing of disconnecting of the switch to connect or disconnect the signal emitter and/or from the guide line.

When mowing, the mower needs to be butt-jointed with the charging station when electricity is insufficient and charging is needed. In the present embodiment, the base station can be a charging station capable of being butt-jointed with the mower to charge the mower, the returning command is a butt-jointing charging command, and the guide signal receiving module receives the guide signal such that the mower is returned to the base station along the guide line, specifically, The control module detects a size relationship between an intensity value of the radio signal received by the second radio signal communication module and sent by the first radio signal communication module and a first preset value and a second preset value, the mower selects a preset charging manner according to the size relationship, and the first preset value is larger than the second preset value.

In the present embodiment, the preset returning mode comprises a first returning mode and a second returning mode;

the first returning mode is specifically that when an intensity value of the radio signal is larger than the second preset value and smaller than the first preset value, the mower moves toward the charging station along the guide line, when the intensity value of the radio signal is larger than the first preset value, the mower sends a converting command of reducing emitting power of the signal emitter toward the charging station, such that the guide signal emitted by the signal emitter is converted to a preset butt-jointing signal, and the mower is butt-jointed with the charging station according to the butt-jointing signal to be charged;

the second returning mode is specifically that when the intensity value of the radio signal is larger than the first preset value, the mower moves to a direction away from the charging station along the guide line till the intensity value of the radio signal is larger than the second preset value and smaller than the first preset value, the mower is subjected to direction adjustment, moves to the charging station along the guide line and enters the first returning mode.

In one of the embodiments, a distance between the mower and the charging station and calculated according to the first preset value is larger than or equal to a minimal distance for butt-jointing charging between the mower and the charging station, and a distance between the mower and the charging station and calculated according to the second preset value is smaller than or equal to a maximal distance of coverage of the radio signal.

Figure 28:
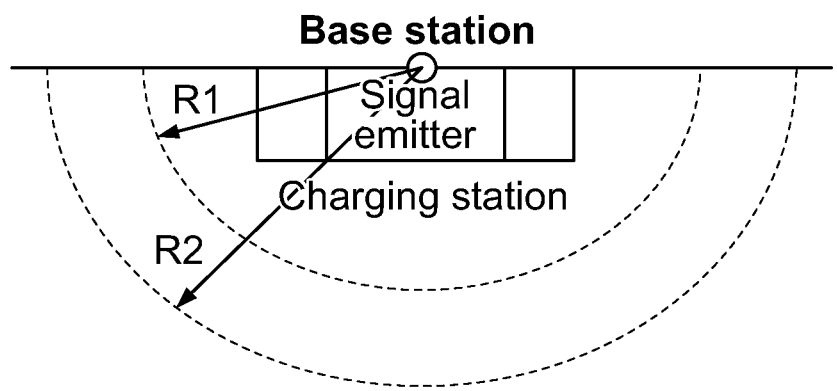
FIG. 28 is a schematic diagram of a corresponding relationship between an intensity and a distance of a set returning signal.

As shown in FIG. 28, when the control module of the mower receives a butt-jointing charging command for butt-jointing with the charging station for charging, the mower moves to the corresponding guide line according to the guide signal received by the guide signal receiving module. At this point, the control module of the mower detects a size relationship between an intensity value of the current radio signal and a first preset value and a second preset value, and the mower selects a preset returning manner according to the size relationship. When the mower and the charging station are butt-jointed, butt-jointing accuracy needs to be ensured. Therefore, when the mower approaches to the charging station, a butt-jointing posture needs to be adjusted at first, a minimal distance needs to be exist between the mower and the charging station to ensure that the mower can adjust a posture per se, therefore, the present embodiment sets a first preset value for a radio signal intensity, a distance between the mower and the charging station calculated according to the first preset value is larger than or equal to a minimal distance R1 for butt-jointing charging between the mower and the charging station, and then the minimal distance R1 is the minimal distance which can ensure that the mower can adjust the posture per se to be butt-jointed with the charging station. When the radio signal is increased along with the distance, the intensity of the radio signal is gradually weakened, the present embodiment sets the second preset value, and a distance between the mower and the charging station calculated according to the second preset value is smaller than or equal to a maximal distance R2 covered by the radio signal.

After the mower moves to the corresponding guide line, if the intensity of the current radio signal is larger than the second preset value and smaller than the first preset value, then the mower can directly move to the charging station along the guide line, when the intensity value of the radio signal is larger than the first preset value, the mower adjusts a posture per se and sends a converting command of reducing emitting power of the signal emitter toward the charging station, such that the guide signal emitted by the signal emitter is converted to a preset butt-jointing signal, and the mower is butt-jointed with the charging station according to the butt-jointing signal to be charged.

In the present embodiment, the signal emitter is connected to the charging station, and the mower can be precisely butt-jointed with the charging station for charging according to the guide signal emitted by the signal emitter. When the mower and the charging station are butt-jointed, a butt-jointing distance between the mower and the charging station needs to be very short and usually in a centimeter level, while under a normal condition, the distance covered by the guide signal emitted by the signal emitter is much too larger than a butt-jointing distance. Therefore, the emitting power of the signal emitter needs to be reduced, such that the distance covered by the guide signal emitted by the signal emitter is close to the butt-jointing distance, the guide signal at this point is the butt-jointing signal, and the mower can be butt-jointed with the charging station to be charged according to the butt-jointing signal.

After the mower moves to the corresponding guide line, if the intensity value of the current radio signal is larger than a first preset value, then it is indicated that the distance between the mower and the charging station is very close, and the mower cannot adjust the posture per se to be butt-jointed with the charging station to be charged. Therefore, the mower needs to move along the guide line to a direction away from the charging station till the intensity value of the radio signal is larger than the second preset value and smaller than the first preset value, and the mower is subjected to direction adjustment, moves to the charging station along the guide line and enters the first returning mode.

Figure 29:
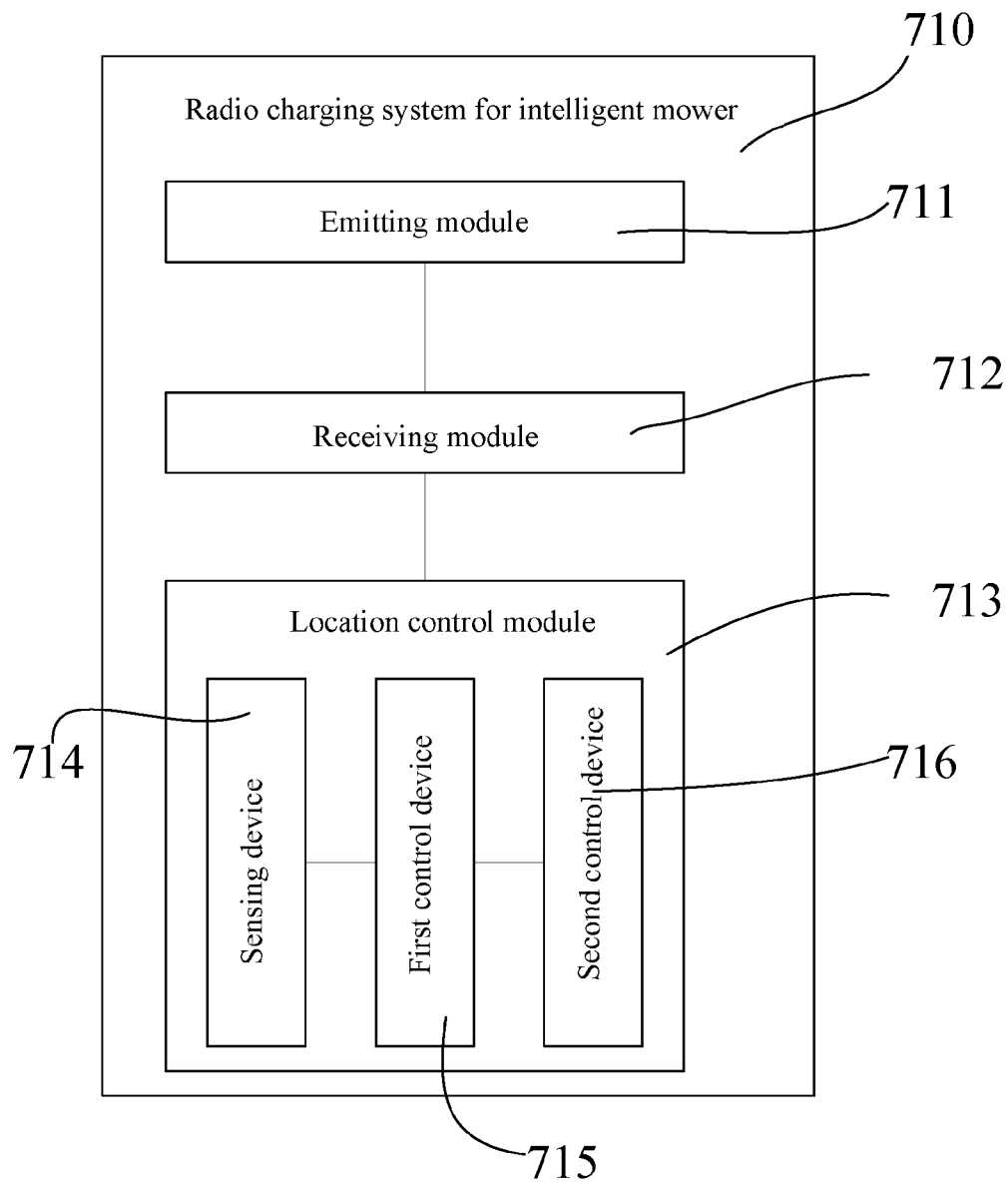
FIG. 29 is a module diagram of a wireless charging system for an intelligent mower of one embodiment.
Figure 30:
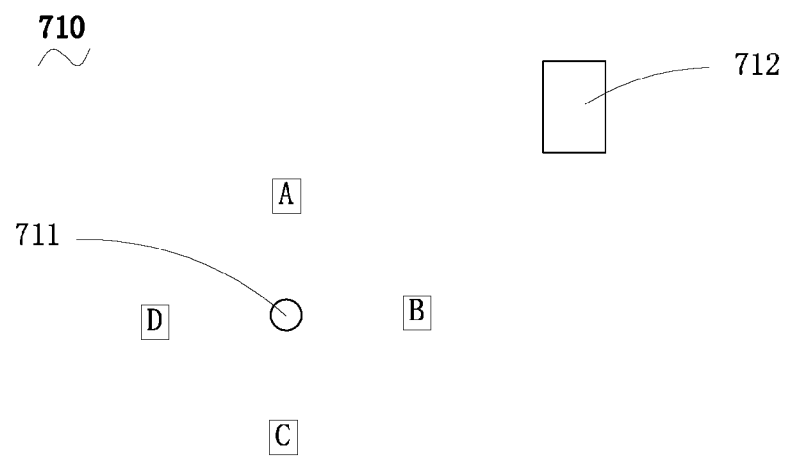
FIG. 30 is a structural schematic diagram of a wireless charging system for an intelligent mower of one embodiment.

Reference is made to FIGS. 29 and 30, the embodiment discloses a wireless charging system 710 for an intelligent mower, which comprises an emitting module 711, a receiving module, 712 and a location control module 731. The emitting module 711 emits a charging signal to the receiving module 712; the receiving module 712 is disposed on the intelligent mower, and a battery in the intelligent mower is charged by a charging signal received by the signal receiving end 712.

The location control module 713 can be disposed on the emitting module 711 and can also be disposed on the receiving module 712, which is not limited, the location control module 713 can set a preset range, the preset range is a range that the receiving module 712 can receive a range of a charging signal emitted by the emitting module 711, the location control module 713 can control the receiving module 712 to move to the preset range, the receiving module 712 only needs to be in any point in the preset range, then the emitting module 711 can emit a charging signal to the receiving module 712 and further the intelligent mower can be charged. The emitting module 711 can emit a charging signal to the location where the receiving module 712 is. Specifically speaking, as shown in FIG. 30, for example, the preset range can comprise a plurality of charging locations, which are respectively point A, point B, point C and point D, the charging locations A, B, C and D points are in the preset range nearby the emitting module 711, generally, the charging location is located at the periphery of the emitting module 711, and to be more specific, the charging locations are set on an arc taking the emitting module 711 as the center. The control module 713 can detect the location of the receiving module 712 and controls the receiving module 712 of the intelligent mower to move to the preset range. Specifically, the location control module 713 comprises a sensing device 714 and a first control device 715. The sensing device 714 is configured to detect the location of the receiving module 712; the first control device 715 is configured to control the receiving module 712 to move to the charging location above. To be more specific, the sensing device 714 can realize a function of detecting the location of the receiving module 712 through a plurality of manners below: the sensing device 714 comprises a hall sensor, and the hall sensor uses electromagnetic sensing to detect the location of the receiving module 712; the sensing device 714 can also comprise an infrared sensor, and the infrared sensor uses the infrared induction to detect the location of the receiving module 712. How the hall sensor or infrared sensor uses characteristics per se to detect the location of the receiving module 712 is prior art and thus not repeated herein in the embodiment.

The first control device 715 has plural following manners to control the receiving module 712 to move to the charging locations (A, B, C and D locations): the first control device 715 comprises a first control unit, a worker can set a specific program in the first control unit in advance to specify the receiving module 712 to be charged in the charging locations point A, point B, point C and point D in sequence. Of course, the charging sequence in the charging locations above can be adaptively changed according to an actual condition, which is not limited by the embodiment; the first control device 715 comprises a second control unit, the second control unit can control the receiving module 712 to select one of the charging locations point A, point B, point C and point D nearby to let the emitting module 711 charge the receiving module 712; and the first control unit 715 can also comprise a third control unit, and the third control unit can control the receiving module 712 to randomly select one of the charging locations point A, point B, point C and point D nearby to let the emitting module 711 charge the receiving module 712.

The location control module 713 uses the first control device 714 to control the receiving module to be charged in different charging locations. Thus, since a plurality of charging locations are disposed, the mower will not be changed repeatedly in the same place, and the problem that the mower grinds grass in the same location for long time to influence the growth of the grass in such location, and further affect the attraction of the lawn is avoided.

In order to enable the emitting module 711 to better transmit a charging signal to the receiving module 712, the location control module 713 also comprises a second control device 716, which can control the emitting module 711 to move to the charging location where the receiving module 712 is, such that the emitting module 711 is closer to the receiving module 712, thus, the receiving module 712 can accurately and more easily receive the charging signal emitted by the emitting module 711.

The first control device 715 and the second control device 716 of the control module above 713 can use a control method such as coordinate location (GPS) or border line guide to respectively control the receiving module 712 and the emitting module 711 to move to a target location, specifically, the first control device 715 and the second control device 716 use GPS location characteristics to determine locations of the receiving module 712 and the emitting module 711 and control the receiving module 712 to move to the emitting module 711 along a set path; or the border line guide technology is used to determine the location of the emitting module 711 by the a border signal intensity and movement is performed along a set path. Since the technology is a common technical means in the art, and is thus not repeated herein in the embodiment.

Figure 31:
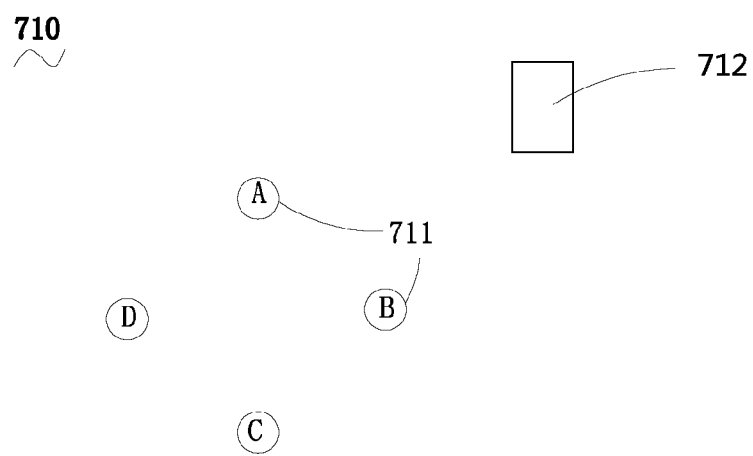
FIG. 31 is a structural schematic diagram of a wireless charging system for an intelligent mower of another embodiment.

Of course, as shown in FIG. 31, in order to enable the receiving module 712 to accurately and more easily receive the charging signal emitted by the emitting module 711, the emitting module 711 can also comprise a plurality of signal emitting units, these emitting units are respectively located on the charging locations above (points A, B, C and D), when the receiving module 712 is located in certain charging location, the emitting unit located in such charging location charges the receiving module 712, for example, when the receiving module 712 selects the charging location Point A to charge the intelligent mower, the signal emitting unit in the Point A emits a charging signal to the receiving module 712, and the charging units in other charging locations do not emit the charging signal to the receiving module 712; on the contrary, when the receiving module 712 selects the charging location Point B to charge the intelligent mower, the signal emitting unit in the Point B sends a charging signal to the receiving module 712, and the charging units in other charging location do not send the charging signal to the receiving module 712; and so on. Another embodiment discloses a wireless charging system for an intelligent mower, the system comprises a wireless electricity emitting module located on the charging station 701, and a wireless electricity receiving module disposed on the intelligent mower and configured to be matched with the wireless electricity emitting module to charge a battery pack, and a guiding module, configured to guide the intelligent mower to move to the charging location, wherein at least two charging locations are disposed, in order to prevent the problem that since the intelligent mower is charged in the same location every time and the grass in such location cannot grow due to grinding for long time, in the embodiment, the intelligent mower is charged in a different charging location every time.

In one embodiment, the charging station 701 is protruded out of a surface of the working area, the lateral surface of the charging station is provided with a wireless electricity emitting module, at this point, the charging station 701 is upright, for example, a charging pile or wireless electricity emitting module is disposed on a wall or other vertical places.

In one embodiment, the charging station 701 comprises a chassis, the chassis has certain area, and the intelligent mower can be charged on the chassis.

Figure 32:
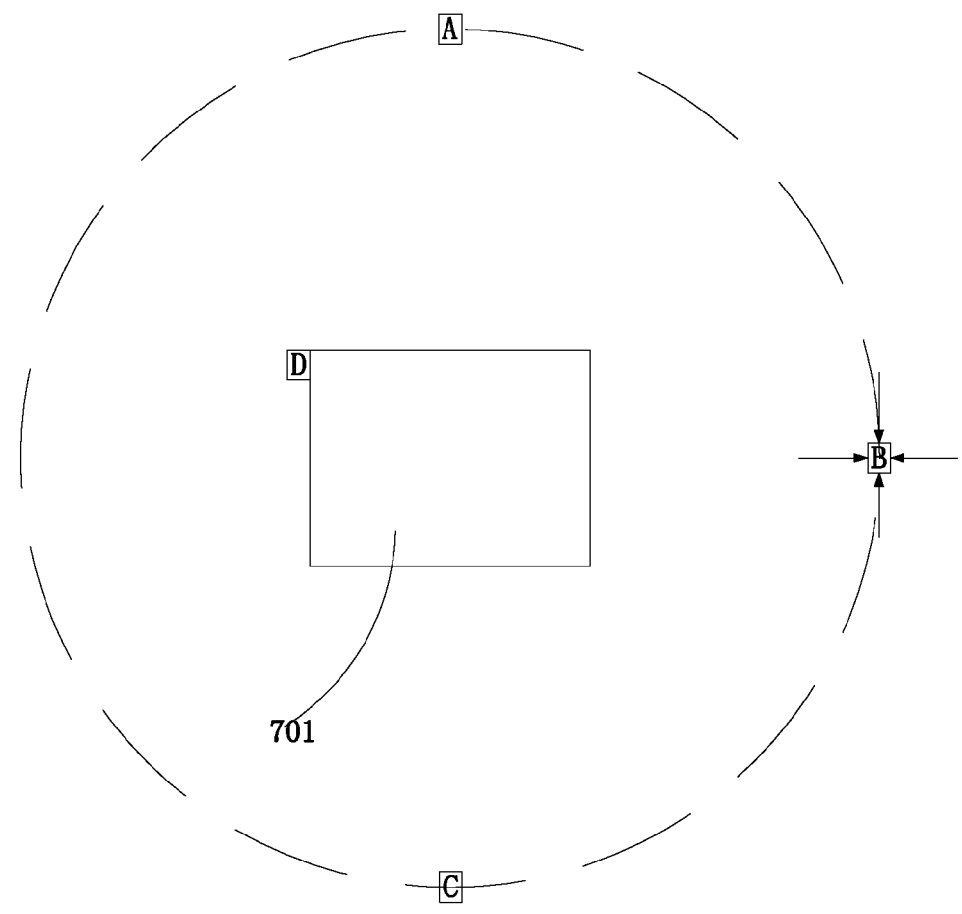
FIG. 32 is a structural schematic diagram of a wireless charging system for an intelligent mower of another embodiment.

Reference is made to FIG. 32, in the first embodiment, the charging station has three charging locations, which are point A, point B and point C respectively, the charging station 701 can be an upright charging pile, etc., and can also be the charging station 701 with a chassis, the charging locations point A, point B and point C are all in a preset range nearby the wireless electricity emitting module on the charging station, generally, the charging locations are at the periphery of the wireless electricity emitting module, and the guiding module guides the intelligent mower to be charged in different charging locations when in charging every time. As shown in FIG. 32, when the intelligent mower is charged in the charging location point A the last time and is charged again, the guiding module guides the intelligent mower to any charging locations of point B and point C for charging. Of course, the charging location can be located on the wireless electricity emitting module, for example, the point D as shown in FIG. 32.

In the present embodiment, a worker can set a specific program in the first control unit in advance, to specify the intelligent mower to be changed in the charging locations point A, point B, point C and point D in sequence. Of course, the charging sequence in the charging locations above can be adaptively changed according to an actual condition, which is not limited by the embodiment. Specifically, a charging sequence relationship in which the charging locations (for example, point A, point B, point C and point D) correspond to charging times of the intelligent mower one to one is set in the control unit of the guiding module in advance, and the control unit queries the corresponding charging location in the charging sequence relationship according to the charging times, and guides the intelligent mower to arrive at the charging location for charging. For example, the charging sequence relationship in the control unit is point A, point B, point C and point D, when the intelligent mower is charged for the first time, the charging location corresponding to the first charging time in a table is queried to be the point A, then the guiding module guides the intelligent mower to be charged at the point A, and when the intelligent mower is charged for the third time, the charging location corresponding to the third charging time in the table is queried to be the point C, and then the guiding module guides the intelligent mower to be charged at the point C, In the present embodiment, the guiding module can use a control method such as coordinate location (GPS) or border line guide to control the intelligent mower to move to a target location, specifically, the control unit uses GPS location characteristics to determine location coordinates of the intelligent mower and the charging location, and the intelligent mower is controlled to move along a set path; or the border line guide technology is used to determine the location of the wireless electricity emitting module by the a border signal intensity and movement is performed along a set path. Since the technology is a common technical means in the art, and is thus not repeated in the embodiment.

In the present embodiment, the control unit uses GPS or electronic compass for location and determines location coordinates of the intelligent mower and location coordinates of the charging locations point A, point B, point C and point D, the charging locations correspond to the charging times one to one, and the guiding module guides the intelligent mower to move to the specific coordinates of the charging locations according to the GPS of electronic compass for charging.

Of course, emitting units for infrared signals or other signals with different frequencies can be disposed on the charging locations, A point, B point, C point and C point, and the infrared signals of different frequencies mark different charging locations.

Of course, in the present embodiment, the guiding module can guide the intelligent mower to select a charging location closest to the intelligent mower for charging. Since the intelligent mower is returned to the charging station 701 from different charging locations every time, the charging location closest to the intelligent mower is selected every time for charging, and the problem that since the mower is charged in the same place every time, and the grass in the same location is ground, growth of the lawn in such location is influenced is avoided.

Of course, in the present embodiment, the guiding module can guide the intelligent mower to randomly select a charging location for charging. Since the intelligent mower is returned to the charging station 701 for charging from different locations every time, the charging location closest to the intelligent mower is selected every time for charging, and the problem that since the mower is charged in the same place every time, and the grass in the same location is ground, growth of the lawn in such location is influenced is avoided.

Figure 34:
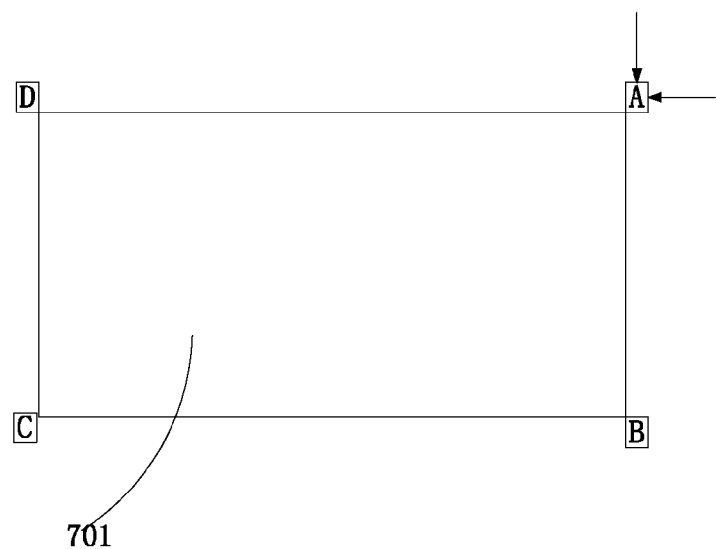
FIG. 34 is a structural schematic diagram of a wireless charging system for an intelligent mower of another embodiment.

Reference is made to FIG. 34, in a second embodiment, the guiding module guides the intelligent mower to be charged in different charging locations, which is basically same as that in the first embodiment, and a difference is that the area of the chassis of the charging station 701 is larger, and the charging locations point A, point B, point C and point D are located on the chassis of the charging station 701. When the guiding module guides the intelligent mower to charge every time, the intelligent mower is charged in different charging locations on the chassis of the charging station. Of course, it is known by those skilled in the art that the charging locations can be at the periphery of the chassis, which is not repeated herein in detail.

Figure 35:
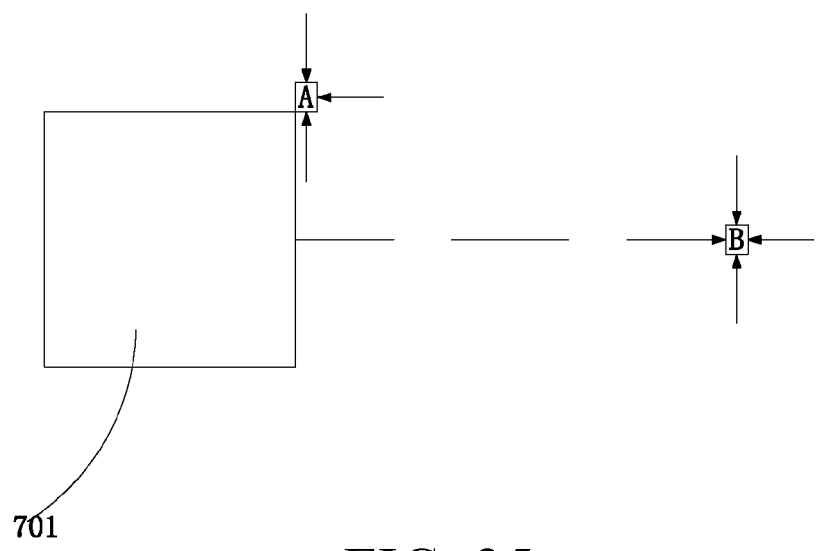
FIG. 35 is a structural schematic diagram of a wireless charging system for an intelligent mower of another embodiment.

Reference is made to FIG. 35, in a third embodiment, the guiding module guides the intelligent mower to be charged in different charging locations, which is basically same as that in the first embodiment, and a difference is that for the two charging locations in the present embodiment, one charging location point A is in the chassis of the charging station 701, and one charging location point B is outside the chassis of the charging station 701, and when the guiding module guides the intelligent mower to charge every time, the intelligent mower is charged in different charging locations on the chassis of the charging station 701.

Figure 36:
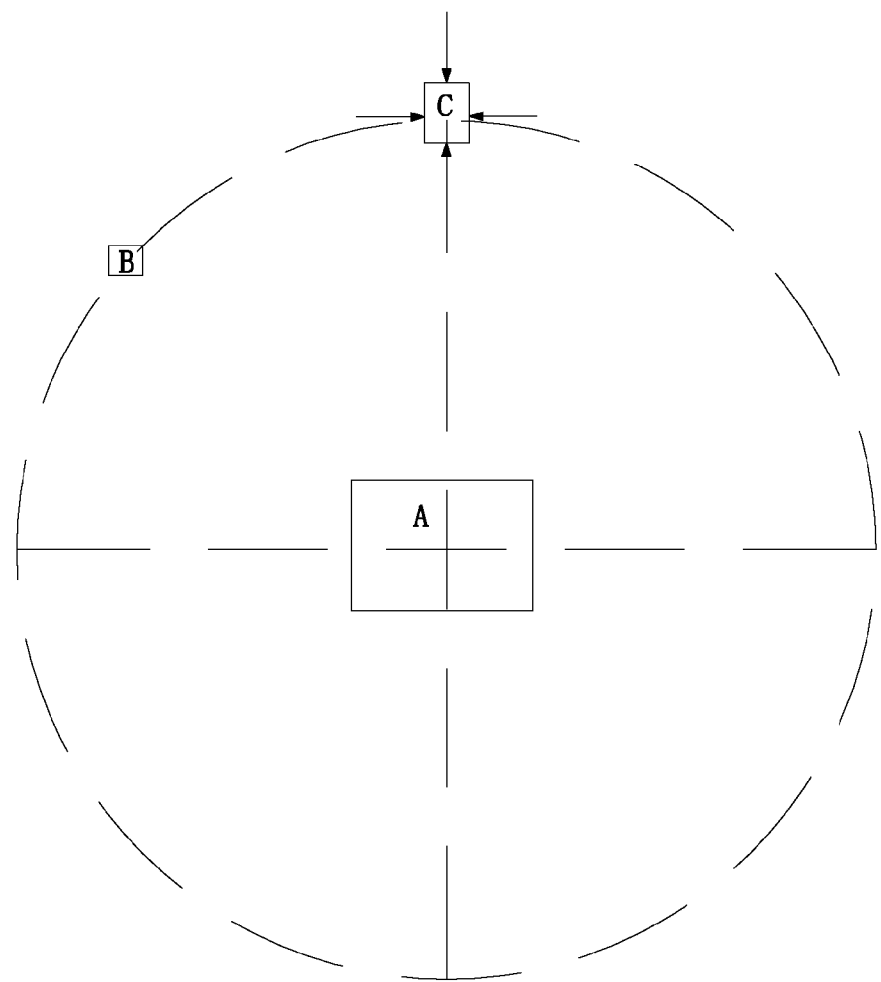
FIG. 36 is a structural schematic diagram of a wireless charging system for an intelligent mower of another embodiment.

Reference is made to FIG. 36, in a fourth embodiment, the guiding module guides the intelligent mower to be charged in different charging locations, which is basically same as that in the first embodiment, and a difference is that in order to enable the intelligent mower to precisely and more easily receive a charging signal emitted by the wireless electricity emitting module, the wireless electricity emitting module can comprise at least two wireless electricity emitting units, one wireless electricity emitting unit is disposed in each charging location, and the intelligent mower can be charged at any one wireless electricity emitting unit. As shown in FIG. 36, three wireless electricity emitting units corresponding to the charging location point A, the charging location point B and the charging location point C. The intelligent mower can be charged in the charging location point A, or the charging location point B or the charging location point C. Specifically, when the intelligent mower is in certain charging location, the emitting unit in such charging location charges the intelligent mower, for example, when the intelligent mower is charged in the charging location point A, the signal emitting unit in the charging location point A sends a charging signal to the intelligent mower, and the signal emitting units in other charging locations do not send a charging signal to the intelligent mower; on the contrary, when the intelligent mower is charged in the charging location point B, the signal emitting unit in the charging location point B sends a charging signal to the intelligent mower, and the signal emitting units in other charging locations do not send a charging signal to the intelligent mower; and so on.

Hence, the intelligent mower is charged on the chassis of the charging station in one of the charging locations and the problem that since the intelligent mower is charged in the same location every time, the grass in such location is ground for long term to affect the growth is prevented.

In the first to fourth embodiments above, the guiding module guides the intelligent mower to be charged in different charging locations. Hence, since a plurality of charging locations are disposed, the mower will not be charged in the same place repeatedly, and the problem that since the mower grinds grass in one same location for long time, growth of the lawn in such location is influenced and further attraction of the lawn is affected is avoided.

In the embodiment, the guiding module guides the intelligent mower to arrive at the charging station along a first direction or a second direction different from the first direction, and specifically, an included angle between the first direction and the second direction is any nonzero angle.

Figure 33:
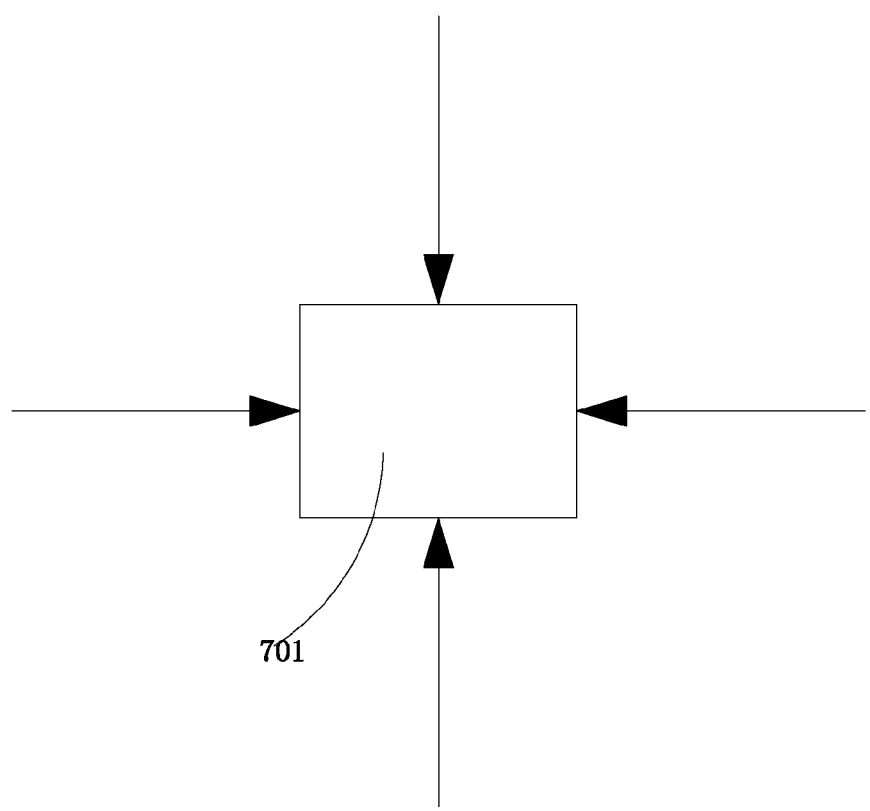
FIG. 33 is a structural schematic diagram of a wireless charging system for an intelligent mower of another embodiment.

Reference is made to FIG. 33, in a fifth embodiment, the area of the chassis of the charging station 701 is smaller, at this point, the guiding module guides the intelligent mower to arrive at the chassis of the charging station 701 from different directions every time for charging. As shown in FIG. 33, the guiding module guides the intelligent mower to arrive at the charging station 701 for charging for four times along a first direction, a second direction, a third direction and a fourth direction, wherein an included angle between the second direction and the first direction is 90°, an included angle between the second direction and the first direction is 180° and an included angle between the fourth direction and the first direction is 270°. Hence, the guiding module guides the intelligent mower to arrive at the charging station 701 from different directions, a path of returning to the charging station is also different every time, hence, since the intelligent mower can arrive at the charging station 701 from any nonzero angle, a plurality of returning paths can be set, the mower will not arrive at the charging station for charging from the same path repeatedly, and the problem that since the mower grinds the grass in the same location for long term, the growth of the grass in such location is affected and further attraction of the lawn is affected is avoided. In the present embodiment, the included angle between the second direction and the first direction is 90°, the included angle between the third direction and the first direction is 180° and the included angle between the fourth direction and the first direction is 270°, which are known by those skilled in the art, and the included angles formed between the first direction, the second direction, the third direction and the fourth direction can be any nonzero angle.

Of course, the guiding module can guide the intelligent mower to arrive at the charging station along the first direction and get away from the charging station along the second direction, and the first direction and the second direction are unparallel, hence, the path of entering the charging station and the path of getting away from the charging station are also different, and the problem that since the mower grinds the grass in the same location for long term, the growth of grass in such location is affected and further attraction of the lawn is affected is avoided.

Reference is made to FIG. 32, in a sixth embodiment, the guiding module guides the intelligent mower to be charged in different charging locations, which is basically same as that in the first embodiment, and a difference is that the guiding module can also guide the intelligent mower to arrive at the charging location along the first direction or second direction different from the first direction, and an included angle formed between the first direction and the second direction is any nonzero angle. As shown in FIG. 32, the guiding module can guide the intelligent mower to arrive at the charging location point B along the first direction, the second direction, the third direction and the fourth direction respectively, the included angle between the second direction and the first direction is 90°, the included angle between the third direction and the first direction is 180° and the included angle between the fourth direction and the first direction is 270°, and it is known by those skilled in the art that the included angles formed between the first direction, the second direction, the third direction and the fourth direction can be any nonzero angle. Hence, the guiding module not only guides the intelligent mower to be charged in different charging locations and but also guides the intelligent mower to arrive at the charging location for charging from different directions, and the problem that since the mower grinds the grass in the same location for long term, the growth of the grass in such location is affected and further attraction of the lawn is affected is avoided.

Of course, the guiding module can guide the intelligent mower to arrive at the charging station along the first direction and get away from the charging station along the second direction, and the first direction and the second direction are unparallel, hence, the path of entering the charging station and the path of getting away from the charging station are also different, and the problem that since the mower grinds the grass in the same location for long term, the growth of the grass in such location is affected and further attraction of the lawn is affected is avoided.

Reference is made to FIG. 34, in a seventh embodiment, the guiding module guides the intelligent mower to be charged in different charging locations, which is basically same as that in the sixth embodiment, and a difference is that an area of the chassis on the charging station 701 is larger, and the charging locations point A, point B, point C and point D are all located on the chassis of the charging station 701. When the guiding module guides the intelligent mower to be charged every time, the intelligent mower is charged in different charging locations on the chassis of the charging station 701.

Reference is made to FIG. 35, in an eighth embodiment, the guiding module guides the intelligent mower to be charged in different charging locations, which is basically same as that in the sixth embodiment, and a difference is that for the two charging locations in the present embodiment, one charging location point A is in the chassis of the charging station 701, and one charging location point B is outside the chassis of the charging station 701, and when the guiding module guides the intelligent mower to be charged every time, the intelligent mower is charged in different charging locations on the chassis of the charging station.

Reference is made to FIG. 36, in a ninth embodiment, the guiding module guides the intelligent mower to be charged in different charging locations, which is basically same as that in the sixth embodiment, and a difference is that in order to enable the intelligent mower to precisely and more easily receive a charging signal emitted by the wireless electricity emitting module, the wireless electricity emitting module at least comprises at least two wireless electricity emitting units, one wireless electricity emitting unit is disposed in each charging location, and the intelligent mower can be charged at any one wireless electricity emitting unit. As shown in FIG. 36, three wireless electricity emitting units correspond to the charging station 701, the charging station 702 and the charging station 703. A chassis of the charging station 701 is in the charging location A, a chassis of the charging station 702 is in the charging location B and a chassis of the charging station 703 is in the charging location C. The intelligent mower can be charged in the charging location point A, or the charging location point B or the charging location point C. Specifically, when the intelligent mower is in certain charging location, the emitting unit in such charging location charges the intelligent mower, for example, when the intelligent mower is charged in the charging location point A, the signal emitting unit in the charging location point A sends a charging signal to the intelligent mower, and the signal emitting units in other charging locations do not send a charging signal to the intelligent mower; on the contrary, when the intelligent mower is charged in the charging location point B, the signal emitting unit in the charging location point B sends a charging signal to the intelligent mower, and the signal emitting units in other charging locations do not send a charging signal to the intelligent mower; and so on.

The point A, point B, point C and point D are merely set for better explaining content of the embodiments, and the quantity, location and a location relationship between the charging locations above can be changed according to actual conditions, and are not limited by the embodiment.

The embodiments above are merely plural embodiments, are described more specifically in more detail, but should not be understood as a limitation to the patent scope. It should be pointed out that for those ordinary skilled in the art, under the premise of not departing from the concept, a plurality of transformations and improvements can be made and fall within a protective scope.

The invention claimed is:

1. A self-moving robot system, comprising:
    a self-moving robot, automatically moving and automatically working in a working area;
    a signal line, comprising an antenna, defining a border of the working area or/and defining a returning path of the self-moving robot;
    a signal generating device, generating a preset signal suitable to be radiated to a free space in a radio wave manner,
    a signal detecting device, detecting the preset signal existing in the free space in the radio wave manner, thereby generating a detection result; and
    a control unit, disposed in the self-moving robot to receive the detection result and controlling the self-moving robot to move according to the detection result,
    wherein the self-moving robot system is characterized in that one end of the signal line is connected to the signal generating device or/and the signal detecting device and the signal line is configured to radiate the preset signal to the free space in the radio wave manner or receive the preset signal existing in the free space in the radio wave manner; and
    the signal line unidirectionally extends from the one end to constitute a circuitry open circuit.

2. The self-moving robot system according to claim 1, wherein the preset signal comprises a modulated signal having a characteristic frequency and a carrier signal having a carrier frequency.

3. The self-moving robot system according to claim 2, wherein the signal detecting comprises recognizing the modulated signal by the characteristic frequency.

4. The self-moving robot system according to claim 1, wherein the control unit judges a distance between the self-moving robot and the signal line according to the detection result.

5. The self-moving robot system according to claim 4, wherein the self-moving robot has a working mode, and under the working mode, the control unit controls the distance between the self-moving robot and the signal line to be larger than or equal to a first preset distance, such that the self-moving robot automatically moves and automatically works at one side of the signal line.

6. The self-moving robot system according to claim 4, wherein the self-moving robot has a returning mode, and under the returning mode, the control unit controls the distance between the self-moving robot and the signal line to be in a preset distance range, such that the self-moving robot is returned to a preset location along the signal line.

7. The self-moving robot system according to claim 1, wherein the detection result comprises a signal intensity.

8. The self-moving robot system according to claim 1, wherein a range of the carrier frequency of the carrier signal is smaller than or equal to 10MHZ.

9. The self-moving robot system according to claim 1, wherein a range of the carrier frequency of the carrier signal is smaller than or equal to 2MHZ.

10. The self-moving robot system according to claim 1, wherein a range of the characteristic frequency of the modulated signal is from 100HZ to 500KHZ.

11. The self-moving robot system according to claim 1, wherein a range of the characteristic frequency of the modulated signal is from 100HZ to 50KHZ.

12. The self-moving robot system according to claim 1, wherein a waveform of the preset signal is trapezoidal wave, square wave, triangular wave or sawtooth wave.

13. The self-moving robot system according to claim 12, wherein a range of rising edge time of the waveform of the preset signal is 100 ns-2000 ns.

14. The self-moving robot system according to claim 12, wherein a range of rising edge time of the waveform of the preset signal is 500 ns-2000 ns.

15. The self-moving robot system according to claim 1, wherein the characteristic frequency of the modulated signal comprises one fixed frequency or a plurality of fixed frequencies.

16. The self-moving robot system according to claim 1, wherein the self-moving robot has a working mode, and under the working mode, the self-moving robot takes the signal line as a border line and automatically walks and works at one side of the signal line.

17. The self-moving robot system according to claim 16, wherein under the working mode, the control unit controls the self-moving robot to move, such that the detection result is always smaller than or equal to a first preset threshold.

18. The self-moving robot system according to claim 1, wherein the self-moving robot system also comprises a charging station, and the charging station is provided with or connected to the signal generating device or/and the signal detecting device.

19. The self-moving robot system according to claim 18, wherein the self-moving robot has a returning mode, and under the returning mode, the self-moving robot takes the signal line as a guide line to return to the charging station along the signal line.

20. The self-moving robot system according to claim 19, wherein under the returning mode, the control unit controls the self-moving robot to move, such that the detection result is always larger than or equal to a second preset threshold and smaller than or equal to a third preset threshold, wherein the third preset threshold is larger than the second preset threshold.

21. The self-moving robot system according to claim 19, wherein the signal generating device is arranged on the charging station, the signal line is connected to the signal generating device, and the self-moving robot is provided with at least one signal detecting device.

22. The self-moving robot system according to claim 19, wherein the self-moving robot is provided with at least two signal detecting devices, including a first signal detecting device and a second signal detecting device;
under the returning mode, after the detection results detected by the first signal detecting device and the second signal detecting device reaching a preset threshold, the control unit controls walking of the self-moving robot, such that an intensity difference between the detection results of the first signal detecting device and the second signal detecting device is in the range of a preset intensity threshold.

23. The self-moving robot system according to claim 18, wherein the self-moving robot is provided with one signal generating device and one signal detecting device, which are of a first signal generating device and a second signal detecting device respectively; the charging station is provided with or connected to one signal detecting device and one signal generating device, which are of a first signal detecting device and a second signal generating device respectively; the first signal generating device and the second signal generating device have the modulated signals with different characteristics frequencies respectively; and the first signal detecting device and the second signal detecting device respectively recognize signals with different characteristic frequencies to generate the detection results of corresponding frequencies.

24. A self-moving robot system, comprising:
a self-moving robot, automatically moving and automatically working in a working area;
a signal line, comprising an antenna, defining a border of the working area or/and defining a returning path of the self-moving robot;
a radio signal generating device, generating a radio signal;
a radio signal detecting device, detecting the radio signal and obtaining a signal intensity value of a preset characteristic frequency,
the signal line comprising a start point and an endpoint, the start point being connected to the radio signal generating device or/and the radio signal detecting device and configured to radio the radio signal or receive the radio signal, the endpoint being a free end of the signal line; and
a control unit, disposed in the self-moving robot to receive the signal intensity value, and controlling the self-moving robot to move such that the signal intensity value accords with a preset algorithm.

25. The self-moving robot system according to claim 24, wherein the preset algorithm comprises a border algorithm, and the border algorithm comprises that the control unit controls the self-moving robot to move to a direction in which the signal intensity value is reduced when the signal intensity value is larger than or equal to a first preset threshold.

26. The self-moving robot system according to claim 24, wherein the preset algorithm comprises a guide algorithm, and the guide algorithm comprises that the control unit controls the self-moving robot to adjust an advancing direction after the signal intensity value is larger than or equal to a second preset threshold, such that a signal intensity of the detection result is in a preset threshold range.

27. The self-moving robot system according to claim 25, wherein when the control unit implements the border algorithm, the self-moving robot takes the signal line as a border line and automatically moves and automatically works at one side of the signal line; and when the control unit implements the guide algorithm, the self-moving robot takes the signal line as a guide line and is returned to a preset location along the signal line.

28. The self-moving robot system according to claim 26, wherein when the control unit implements the border algorithm, the self-moving robot takes the signal line as a border line and automatically moves and automatically works at one side of the signal line; and when the control unit implements the guide algorithm, the self-moving robot takes the signal line as a guide line and is returned to a preset location along the signal line.

* * * * *